(12) United States Patent
Cericola et al.

(10) Patent No.: US 12,134,561 B2
(45) Date of Patent: Nov. 5, 2024

(54) SURFACE-FUNCTIONALIZED CARBONACEOUS PARTICLES, METHODS OF MAKING, AND APPLICATIONS OF THE SAME

(71) Applicant: IMERTECH SAS, Paris (FR)

(72) Inventors: Dario Cericola, Bodio (CH); Michael Spahr, Bellinzona (CH)

(73) Assignee: IMERTECH SAS (FR)

( * ) Notice: Subject to any disclaimer, the term of this patent is extended or adjusted under 35 U.S.C. 154(b) by 727 days.

(21) Appl. No.: 17/256,076

(22) PCT Filed: Jun. 27, 2019

(86) PCT No.: PCT/EP2019/067244
§ 371 (c)(1),
(2) Date: Dec. 24, 2020

(87) PCT Pub. No.: WO2020/002550
PCT Pub. Date: Jan. 2, 2020

(65) Prior Publication Data
US 2021/0147237 A1  May 20, 2021

(30) Foreign Application Priority Data
Jun. 27, 2018 (EP) .................................... 18305824

(51) Int. Cl.
*C01B 32/05* (2017.01)
*C09C 1/56* (2006.01)
*H01M 4/133* (2010.01)

(52) U.S. Cl.
CPC .............. *C01B 32/05* (2017.08); *C09C 1/565* (2013.01); *H01M 4/133* (2013.01);
(Continued)

(58) Field of Classification Search
CPC ......... C01B 32/05; C01B 32/00; C09C 1/565; H01M 4/133; H01M 4/13; H01M 4/625;
(Continued)

(56) References Cited

U.S. PATENT DOCUMENTS 4,367,208 A * 1/1983 Glasstetter ................ C09C 1/56
383/110
4,929,280 A 5/1990 Wideman
(Continued)

FOREIGN PATENT DOCUMENTS

CN 1239592 A 12/1999
CN 102502603 A 6/2012
(Continued)

OTHER PUBLICATIONS

Shourui et al., "Surface modification and characterization of carbon black by sodium lignosulphonate," Surf. Interface Anal., 49:197-204 (2017).
(Continued)

*Primary Examiner* — Daniel C. McCracken
(74) *Attorney, Agent, or Firm* — FINNEGAN, HENDERSON FARABOW, GARRETT & DUNNER LLP

(57) ABSTRACT

The present disclosure relates to surface-functionalized carbonaceous particles, optionally in agglomerated form, methods for making such surface-functionalized carbonaceous particles and their use, for example as conductive additives in battery electrodes. The surface-functionalized carbonaceous particles are for example obtainable by milling a non-graphitic carbon material, followed by subsequent functionalization through controlled oxidation. The surface-functionalized carbonaceous particles can be used as additive in battery electrodes. The disclosure also pertains to dispersions of such carbonaceous materials in a liquid
(Continued)

Material No. 1 medium and their use as, among others, conductive coatings. Polymer compounds filled with the surface-functionalized carbonaceous particles are also disclosed.

18 Claims, 6 Drawing Sheets

(52) U.S. Cl.
CPC ...... *C01P 2004/51* (2013.01); *C01P 2004/61* (2013.01); *C01P 2006/12* (2013.01); *C01P 2006/14* (2013.01); *C01P 2006/19* (2013.01)

(58) Field of Classification Search
CPC .............. C01P 2004/51; C01P 2004/61; C01P 2006/12; C01P 2006/14; C01P 2006/19; C01P 2004/62; Y02E 60/10; C08K 3/04; H01G 11/32; H01G 11/86
USPC ............................ 423/449.1–449.9, 450–458
See application file for complete search history.

(56) References Cited

U.S. PATENT DOCUMENTS

| 2009/0242830 | A1 | 10/2009 | Mao et al. |
| 2012/0077080 | A1 | 3/2012 | Liu et al. |
| 2015/0099180 | A1* | 4/2015 | Cericola ............... H01G 11/42 252/502 |

FOREIGN PATENT DOCUMENTS

| CN | 102502603 B | 4/2013 |
| CN | 103190018 A | 7/2013 |
| CN | 103328378 A | 9/2013 |
| CN | 104271502 A | 1/2015 |
| CN | 105190948 A | 12/2015 |
| CN | 105229834 A | 1/2016 |
| CN | 106082203 A | 11/2016 |
| CN | 106170880 A | 11/2016 |
| CN | 106252581 A | 12/2016 |
| DE | 25 20 200 A1 | 11/1975 |
| GB | 1 484 601 | 9/1977 |
| JP | 2006-104002 A | 4/2006 |
| JP | 2007-269553 A | 10/2007 |
| JP | 2015-525184 A | 9/2015 |
| WO | WO 2013/174536 A1 | 11/2013 |
| WO | WO 2017/125592 A1 | 7/2017 |

OTHER PUBLICATIONS

Shourui Li et al., "Surface Modification and Characterization of Carbon Black by Sodium Lignosulphonate: Carbon Black Modified by Sodium Lignosulphonate," Surface and Interface Anaysis, vol. 49, No. 3, Mar. 1, 2017 (Mar. 2017), pp. 197-204, CP055525845, GB, ISSN: 0142-2421, DOI: 10.1002/sia.6115.
International Search Report for International Application PCT/EP2019/067244, dated Jan. 2, 2020.

* cited by examiner

Precursor Material for Materials No. 1, 6, 7

Precursor Material for Materials No. 2, 3

Precursor Material for Materials No. 4, 5

Material No. 1

Material No. 2

Material No. 3

Material No. 4

Material No. 5

Material No. 6

Material No. 7 a) Precursor Mat. No. 1,6,7 b) Precursor Mat. No. 2,3 c) Precursor Mat. No. 4,5 a) Material No. 1 b) Material No. 2 c) Material No. 3 d) Material No. 4 e) Material No. 5 f) Material No. 6 g) Material No. 7

SURFACE-FUNCTIONALIZED CARBONACEOUS PARTICLES, METHODS OF MAKING, AND APPLICATIONS OF THE SAME

This application is a national stage entry of PCT/EP2019/067244, filed on Jun. 27, 2019, which claims the benefit of priority from EP18305824.7, filed on Jun. 27, 2018, the content of each of which is incorporated by reference herein in its entirety.

FIELD OF THE DISCLOSURE

The present disclosure relates to surface-functionalized carbonaceous particles, methods for preparation thereof, and their use, for example as conductive additives in a variety of applications.

BACKGROUND

Conductive carbon particles are commonly used as fillers to enhance the conductivity in polymers, ceramics, coatings, and electrodes of electrochemical systems. For example, carbon conductive additives are used in a variety of primary and secondary batteries like alkaline zinc/manganese dioxide batteries, zinc carbon batteries, lithium primary and rechargeable batteries, nickel cadmium batteries, lead acid batteries, and nickel metal hydride batteries, lithium sulfur batteries, lithium air batteries, metal air batteries with metals like zinc or iron, fuel cells as well as capacitor systems.

Conductive additives are applied in electrodes of electrochemical cells to decrease the electrical electrode resistance. Carbonaceous powdered materials are often selected as conductive additives due to their light weight and inertness towards acidic and alkaline electrolytes. Conductive additives do not contribute to the electrochemical processes of the electrode, which means that for a high energy density of the cell, the applied quantity of conductive additive is desirably minimized. Typical carbon conductive additives used are fine graphite powders and conductive carbon black (see for example, M. E. Spahr, Lithium-ion Batteries-Science and Technology, M. Yoshio, R. J. Brodd, A. Kozawa (Eds.), Springer, New York, 2009, Chapter 5).

The addition of a small amount of conductive carbon to the negative electrode of a lead acid battery leads to an improvement of the cycle life when the battery works in high-rate partial state-of-charge (HRPSoC) mode as for example applied in the use of hybrid electric vehicles (see for example, K. Nakamura, M. Shiomi, K. Takahashi, M. Tsubota, Journal of Power Sources 59 (1996) 153, M. Shiomi, T. Funato, K. Nakamura, K. Takahashi, M. Tsubota, Journal of Power Sources, 64 (1997), 147 and D. Pavlov, P. Nikolov, T. Rogachev Journal of Power Sources 196 (2011) 5155-5167). When a lead acid battery is operated at partial state-of-charge (PSoC) the irreversible formation of lead acid sulfate ("sulfation effect") causes a significant reduction of the battery cycle life (see, for example, D. Pavlov, Lead-Acid Batteries-Science and Technology, Elsevier 2011, Chapter 1, pp. 23-26). In addition, an increased electrode surface being created by inserting the carbon additive into the electrode structure is known to cause an increased charge acceptance of the lead acid battery being required when electricity generated from the braking energy is charged to the lead acid battery. The increased electrode surface area is believed to create a supercapacitor effect which explains the ability to charge the electrode at higher current rate. The requirements for the carbon therefore is a high electrical conductivity as well as a high lead uptake when the carbon is immersed into the lead salt solution. The incorporated lead forms the nuclei for the lead deposition during the first electrochemical charging process of the lead acid electrochemical cell (D. Cericola, M. Spahr, Journal of Power Sources 324 (2016), 41-44).

Besides using carbon additives, it is known in the art to use modified grid designs, glass fiber mats soaked with the sulfuric acid electrolyte, for example in valve-regulated lead acid batteries (VRLAB), and/or modified electrolyte compositions as other ways to improve the conventional starting, lighting, ignition (SLI) lead acid batteries and make them useful for operation modes at lower states of charge (SOC) (cf., for example, D. Pavlov, Lead-Acid Batteries-Science and Technology, Elsevier 2011, Chapter 7). The battery characteristics obtained in these advanced lead acid batteries at shallow high rate discharge operations make them good candidates for micro- and mild hybrid electric vehicles.

The addition of graphite, expanded graphite, activated carbon, and carbon black to the negative electrode has been shown to result in an improvement of the cycle life of the lead acid batteries, primarily by a reduction of the sulfation effect.

Several hypotheses have been proposed to explain the mechanism of the carbon effect in the negative electrode. A survey of the influence of a wide spectrum of carbons has been summarized in the literature (P. T. Moseley, Journal of Power Sources 191 (2010) 134-138 and D. P. Boden, D. V. Loosemore, M. A. Spence, T. D. Wojcinski, Journal of Power Sources, 195 (2010) 4470-4493). It has been shown recently that the carbon should have a high affinity to lead in order to enable the formation of a carbon-lead skeleton in the negative electrode while plating lead during the electrode formation performed in the first charging of the fresh newly assembled cell (D. Pavlov, P. Nikolov, T. Rogachev, Journal of Power Sources 196 (2011) 5155-5167). This carbon-lead skeleton increases the surface area and in addition the carbon provides an additional supercapacitor effect in the electrode, both of which provide possible explanations for the increased charge acceptance.

In addition to the electrical conductivity properties, conductive additives also have an effect on the electrode structure and porosity. For example, the electrolyte penetration of the electrode can be influenced by the electrode structure and porosity, which has an impact on the ionic resistivity of the electrode (see for example, M. E. Spahr, Lithium-ion Batteries-Science and Technology, M. Yoshio, R. J. Brodd, A. Kozawa (Eds.), Springer, New York, 2009, Chapter 5).

The positive electrode of a lithium sulfur battery contains sulfur mixed with binder materials and one or more carbon components. The carbon provides the electrical conductivity and in addition is thought to assure the dimensional stability of the electrode during the discharge of the cell when the sulfur content of the positive electrode is decreased by the formation of the discharge products (see, for example, Xiong, Shizhao; Hong, Xiaobin; Xie, Kai; Rong, Lixia, Huagong Jinzhan (2011), 30(5), 991-996 and Yao, Zhen-Dong; Wei, Wei; Wang, Jiu-Lin; Yang, Jun; Nuli, Yan-Na, Wuli Huaxue Xuebao (2011), 27(5), 1005-1016).

Furthermore, electrochemical cells with air electrodes, contained in fuel cell stacks or metal air batteries, can require carbonaceous materials in the positive air electrodes. It is thought that the carbon materials act as support for the metal or metal oxide catalyst and also generate the structure providing dimensional stability to the electrode. In order to be used in air electrodes, carbon supports are required to demonstrate a high corrosion resistance to air or oxygen, as failure to do so is thought to limit cell durability (see for example, S. Sarangapani, P. Lessner, L. Swette, J. Giner, Proceedings—Electrochemical Society (1992), 92-11(Proc. Workshop Struct. Eff. Electrocatal. Oxygen Electrochem., 1992), 510-22, S. Muller, F. Holzer, H. Arai, O. Haas, Journal of New Materials for Electrochemical Systems (1999), 2(4), 227-232 and F. Maillard, P. Simonov, E. Savinova, Carbon Materials for Catalysis (2009), 429-480).

As mentioned above, natural or synthetic graphite, expanded graphite, activated carbon and carbon black have all been used as conductive additives.

Graphite is crystalline carbon. The electronic conductivity of graphite is based on the crystal graphite structure which consists of stacked layers of six-membered carbon rings with delocalized electrons in conjugated p-orbitals parallel to the graphite layers. The electronic conductivity parallel to the stacked planes is about three orders of magnitude higher than the electronic conductivity perpendicular to the planes. This results in the known anisotropic behaviour of the electronic conductivity (A. W. Hull, Phys. Rev. 10 (1917) 661 and W. Primak, L. H. Fuchs, Phys. Rev. 95(1) (1954) 22).

The application of graphite as, for example, a conductive additive could be attributed to properties such as its high compaction ability, which results in improvements in the electrode density of the cell. It has also been demonstrated that a carbon conductive additive can significantly increase the cycling stability and low temperature charge/discharge performance of the electrode.

High surface area graphite is typically obtained by decreasing the particle size of graphite in a milling process. To avoid any oxidation of the graphite product during milling, milling can be carried out in an inert gas atmosphere (see for example, N. J. Welham, J. S. Williams, Carbon 36(9) (1998) 1309-1315, T. S. Ong, H. Yang, Carbon, 38 (2000) 2077-2085 and Y. Kuga, M. Shirahige, Y. Ohira, K. Ando, Carbon 40 (2002), 695-701). Under these conditions the down-sized graphite particles tend to form loosely-bound aggregates. The typical milling process is performed in an air atmosphere, under these conditions the milling of graphite results in the downsizing of the graphite particles. A drawback of conventional milling processes is that the resulting graphite materials can contain a relatively high amount of trace metals due to the wear of the metal-based milling equipment. Metal trace elements may act as electrocatalysts interfering with the desired electrochemical process and cause parasitic chemical or electrochemical side reactions, thereby decreasing the cycling stability and reduce the cell life.

Carbon black is an amorphous form of carbon. The carbon black structure is made up of typically spherical amorphous or paracrystalline primary particles which are bound together by covalent bonds to form larger aggregates. Conductive carbon black typically consists of primary particles of 10-50 nm in size and large complex aggregates are often more than 100 nm in diameter. A further agglomeration by electrostatic forces contributes to the carbon black structure as well. The conductive carbon black aggregates form a conductive network in porous electrodes thus decreasing the electronic resistance beyond the percolation threshold observed at a critical carbon concentration (J. B. Donnet, R. P. Bansal, M. J. Wang, in *Carbon Black Science and Technology*, 2nd ed., Marcel Dekker Inc., New York, 1993). The large intra- and inter-aggregate void volume of conductive carbon black created by the carbon black structure results in high oil absorption numbers. Conductive carbon blacks typically have oil absorption numbers above 150 ml/100 g (measured according to ASTM D2414-01, see method described below).

Another class of carbonaceous material is activated carbon. Activated carbon is composed of amorphous high surface area carbon powders derived from natural organic products like coconut shells or wooden products or polymers. These precursors are carbonized at temperatures between 700 and 1600° C. under inert atmosphere. Subsequent to carbonization, the material is subjected to an activation process using steam, $CO_2$, or aqueous zinc chloride solutions at elevated temperatures, which increases the BET surface area of the carbonized material. The activation process forms so-called "micro-pores" as well as mesopores which are thought to be the cause for the observed increase in surface area (see for example, H. Marsh, F. Rodriguez-Reinoso, Activated Carbon, Elsevier, 2006).

The use of carbon black as, for example, a conductive additive can be attributed to properties such as high liquid absorption, which appears to lead to a higher electrolyte penetration in the electrode. Furthermore, the addition of the high surface area carbon component to the negative electrode of a lead acid battery has been observed to result in a noticeable increase of the charge acceptance due to the increased electrochemically available inner electrode area, which appears to be a consequence of the more "open" structure of the electrode. A further explanation for the positive effect of carbon black additives is that the charging of the additional carbon surface (supercapacitor effect) may lead to an increased electrochemical capacity, which is a desired property in, for example, lead acid battery negative electrodes and supercapacitors.

However, despite the applications of high surface area carbons as carbon additives, some adverse consequences with respect to cycle life, performance at high rate and low temperature discharge have been observed in lead acid batteries. The observed effects are associated with electrochemical and chemical side reactions occurring at the increased electrode surface. A further problem associated with high surface area carbon components is a high water up-take during formulation of the electrode paste, which may negatively influence the production of the electrodes containing such additives.

Furthermore, the decomposition of the aqueous electrolyte, which happens as a parasitic side reaction in the lead acid battery during charging, leads to hydrogen formation at the negative electrode. It has been found that the electrolyte decomposition rate is accelerated by the high surface area of the carbon and in presence of typical metal impurities. Also, the oxygen formed in this reaction at the positive electrode could be a cause of oxidative carbon corrosion which seems to occur particularly with high surface area amorphous carbons. The decomposition of the electrolyte up to the dry-out of the battery is considered as severe safety issue.

It can be seen from the aforementioned properties that conductive carbon additives appear to have a significant impact on the electrode engineering, its properties, and the manufacturing process of the electrode.

As described above, graphite and conductive carbon black appear to have many complementary properties, when considering their use as conductive additives in electrodes. As both low and high surface area carbons (graphite and amorphous/non-graphitic carbon powders) have shown to exert positive effects yet suffer from different drawbacks in the intended applications, attempts to use a mixture of the two have been described in the literature (see for example, M. Fernandez, Batteries & Energy Storage (BEST) Spring 2011 81-93 and M. Fernandez, N, Munoz, R. Nuno, F. Trinidad, Proceedings of the 8$^{th}$ International Conference on Lead Acid Batteries, Extended Abstract #6, Lead Acid Battery Department of the Bulgarian Academy of Science, Sofia, Bulgaria, Jun. 7-10, 2011, p. 23-28). However, such mixtures are fraught with problems. For example, in the manufacturing process of the negative electrode, the required homogeneous mixing of two carbon components, one of which has a very low volume density in the lead oxide paste formulation, can be problematic.

Efforts to overcome such problems have been described in the prior art. For example, WO 2013/174536 to Imerys Graphite & Carbon Switzerland describes a process wherein graphite is first milled under inert conditions, followed by functionalizing the surface of the milled graphite particles by controlled oxidation, i.e. exposure to an oxygen-containing atmosphere under defined conditions.

Accordingly, it is an object of the invention to provide yet another advantageous carbon material which can be reliably made, is easy to handle and has excellent physicochemical and electrochemical properties, especially when used as a carbon component in an electrode, as well as methods for its preparation.

SUMMARY

The present disclosure provides novel surface-functionalized carbonaceous particles comprising a non-graphitic core, as well as method for making them as well as uses for said particles. They exhibit favorable mechanical and electrochemical properties, for example when used as a carbon additive or component in electrode materials.

Accordingly, the present disclosure relates in a first aspect to a method of preparing surface-functionalized carbon particles, which comprises the steps of:
  a) applying mechanical forces to a non-graphitic carbonaceous material in a gas-tight sealed container; and
  b) functionalizing the resulting modified carbon particles by controlled oxidation.

One example for applying mechanical forces includes, but is not limited to milling, which reduces, and homogenizes the size of the starting particles to the desired size. In some instances, the activation of the surface of the particles upon milling will lead to agglomeration of the fine carbon particles as well as an increased reactivity versus oxidative reactants. Functionalization step b) is typically achieved by exposing the particles obtained from step a) to an oxygen-containing atmosphere until the particles (optionally in agglomerated form) have the desired properties.

Optionally, the method may also include the preparation of the deagglomerated product, by dispersing the surface-functionalized agglomerated particles obtained from the functionalization step in a liquid (typically water or water/alcohol mixtures) in the presence of a stabilizing amount of a dispersant or in a polymer by applying mainly shear forces.

A further aspect of the present disclosure thus relates to surface-functionalized carbon particles characterized by a crystallographic $L_c$ value of less than about 14 nm, or less than about 12 nm, or less than about 10 nm; and an oxygen content greater than about 0.6 wt %, or greater than about 0.8 wt %, or greater than about 1 wt %. As noted above, such particles may optionally represent agglomerates of finer primary carbon particles. The surface-functionalized carbonaceous particles may for example be obtained by the process mentioned above, and further described herein below.

Dispersions of the surface-functionalized carbonaceous particles in deagglomerated form are a further related aspect of the present disclosure. Another aspect of the disclosure relates to the use of a dispersion of the surface-functionalized carbonaceous particles as a conductive or lubricating coating.

Yet another aspect of the present invention relates to a polymer compound filled with the surface-functionalized carbon particles of the invention and a battery electrode comprising the surface-functionalized carbon particles of the invention as a conductive additive, and, optionally other compounds such as barium sulfate and/or lignosulfates as functional additives.

A further aspect of the present invention is directed to the provision of a conductive additive comprising the surface-functionalized carbonaceous particles, wherein the conductive additives can be used in a variety of applications such as in lead acid batteries, lithium sulfur batteries, electrochemical double layer capacitors, catalyst supports, and others.

DETAILED DESCRIPTION OF EXEMPLARY EMBODIMENTS OF THE INVENTION

Figure 1:
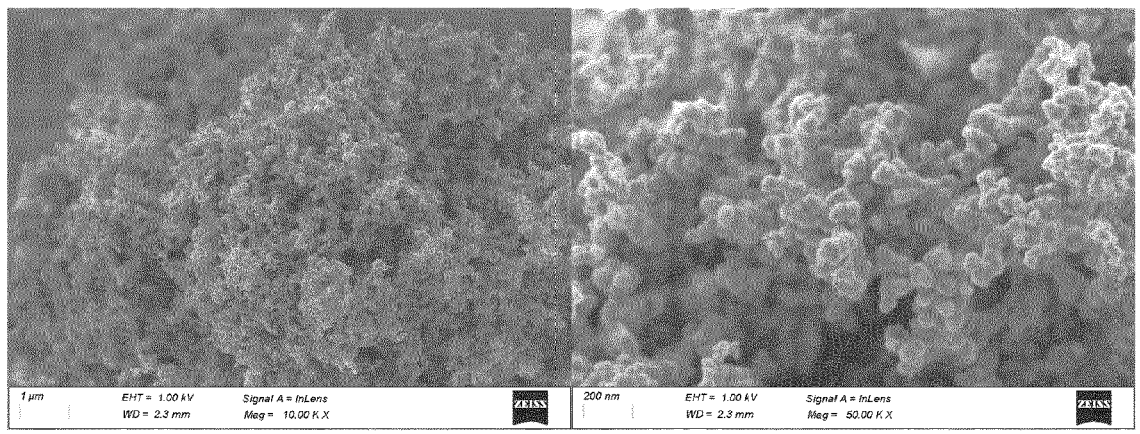
FIG. 1 shows SEM pictures (at two different resolutions) of the untreated precursor material for surface-functionalized carbon particle materials no. 1, 6, and 7.
Figure 2:
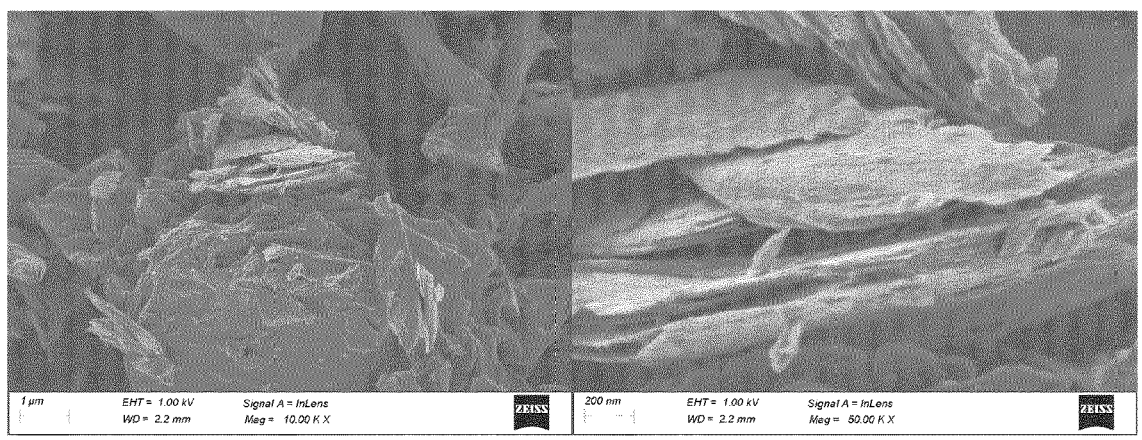
FIG. 2 shows SEM pictures (at two different resolutions) of the untreated precursor material for surface-functionalized carbon particle materials no. 2 and 3.
Figure 3:
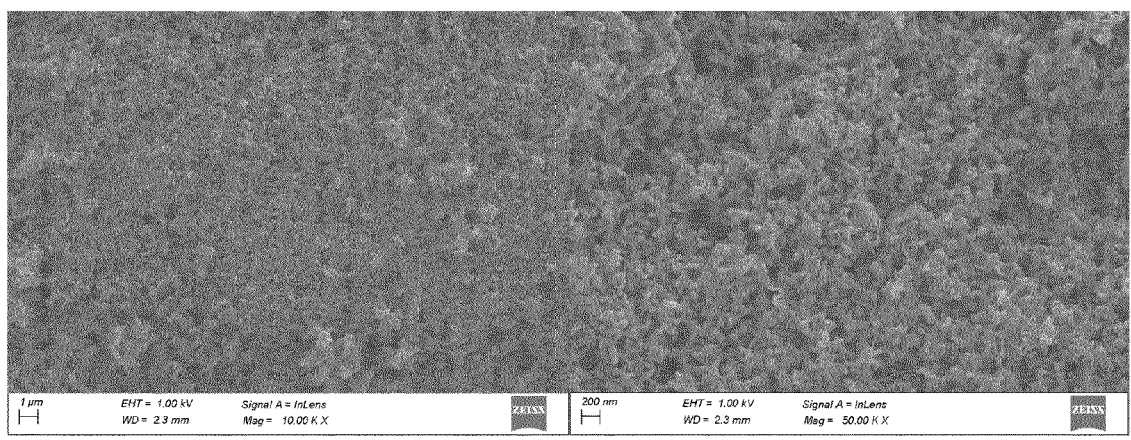
FIG. 3 shows SEM pictures (at two different resolutions) of the untreated precursor material for surface-functionalized carbon particle materials no. 4 and 5.
Figure 4:
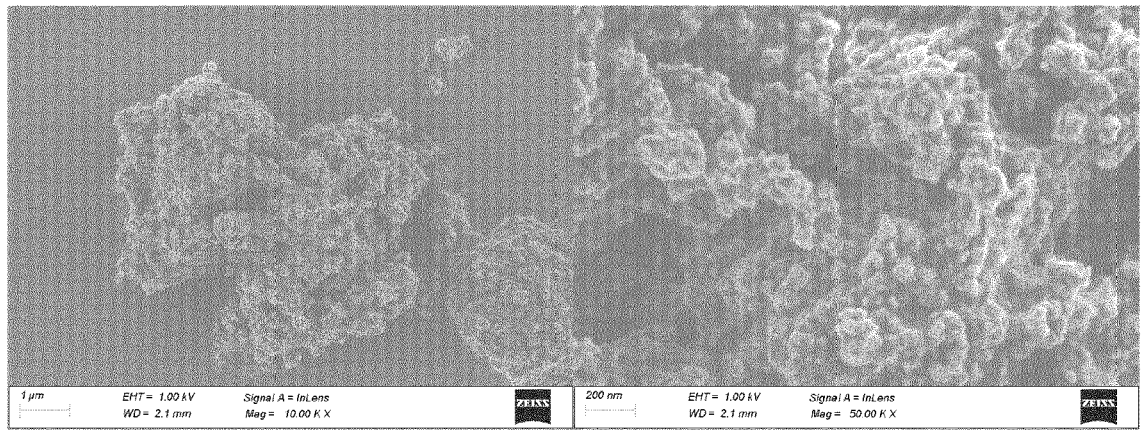
FIG. 4 shows SEM pictures (at two different resolutions) of surface-functionalized carbon particle material no. 1 obtained according to Example 1.
Figure 5:
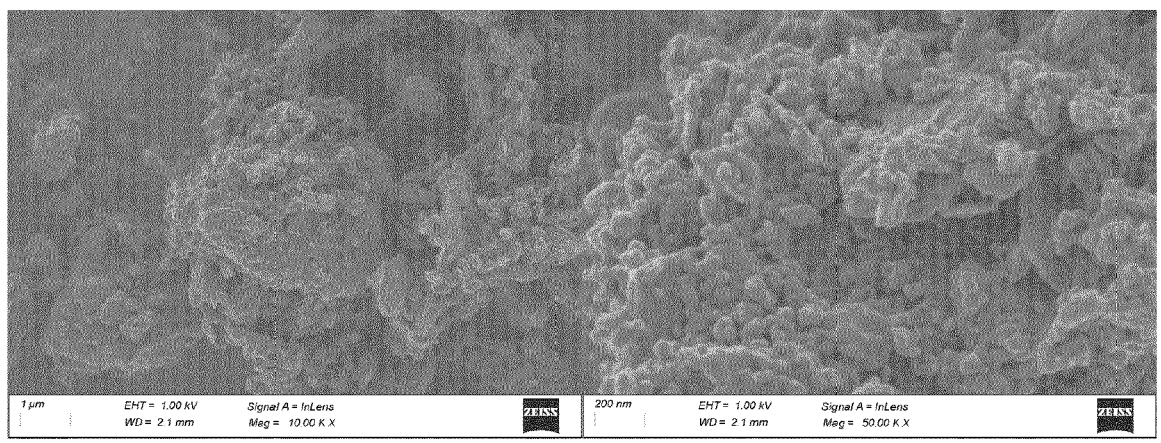
FIG. 5 shows SEM pictures (at two different resolutions) of surface-functionalized carbon particle material no. 2 obtained according to Example 1.
Figure 6:
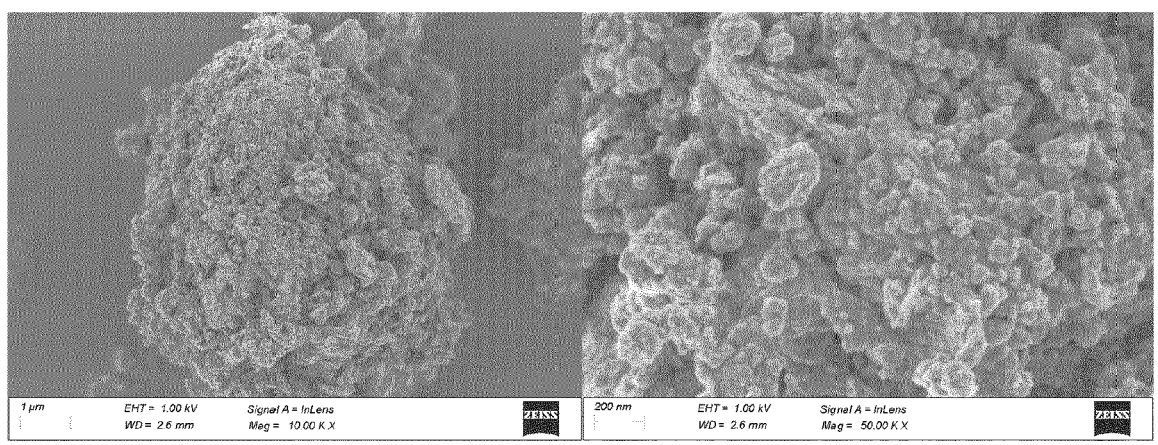
FIG. 6 shows SEM pictures (at two different resolutions) of surface-functionalized carbon particle material no. 3 obtained according to Example 1.
Figure 7:
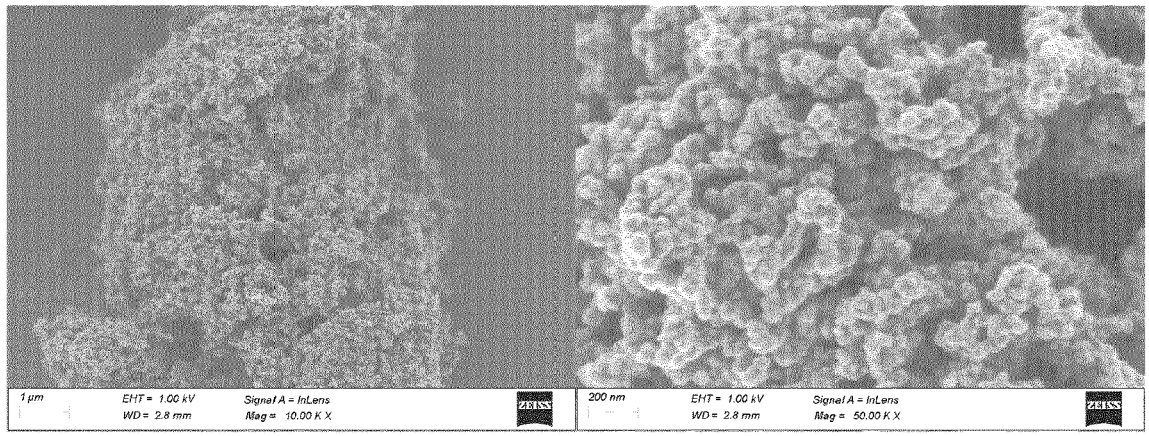
FIG. 7 shows SEM pictures (at two different resolutions) of surface-functionalized carbon particle material no. 4 obtained according to Example 1.
Figure 8:
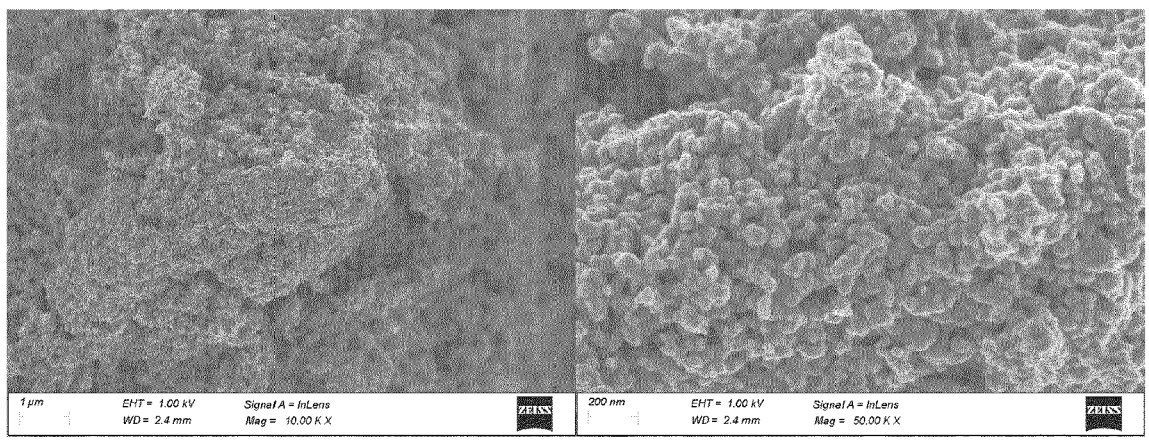
FIG. 8 shows SEM pictures (at two different resolutions) of surface-functionalized carbon particle material no. 5 obtained according to Example 1.
Figure 9:
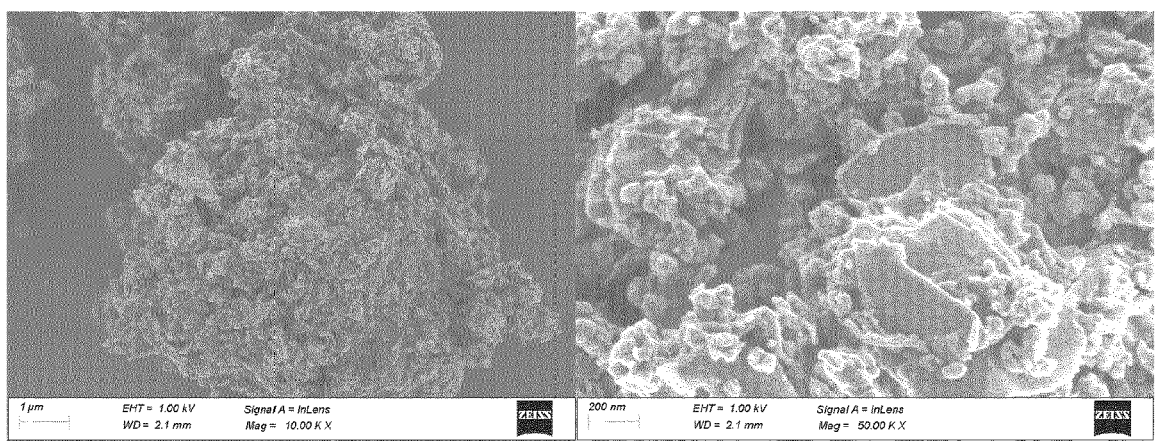
FIG. 9 shows SEM pictures (at two different resolutions) of surface-functionalized carbon particle material no. 6 obtained according to Example 2.
Figure 10:
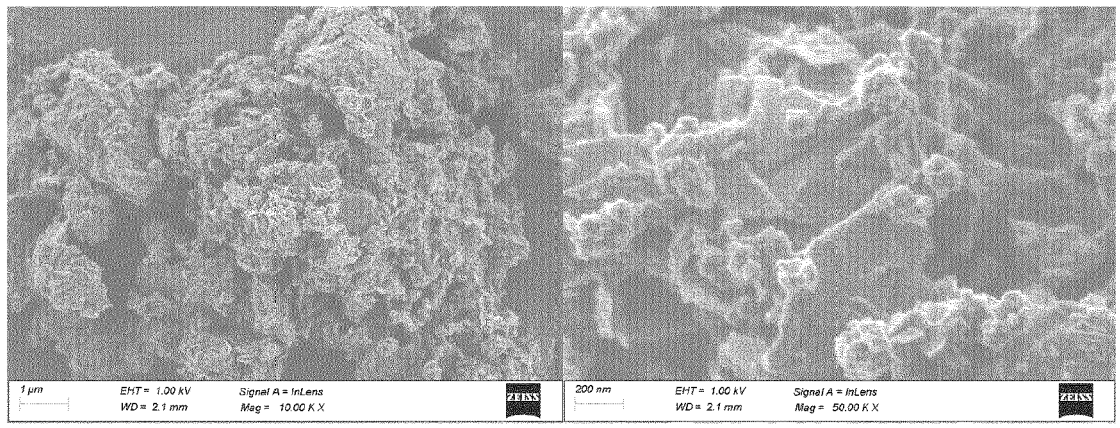
FIG. 10 shows SEM pictures (at two different resolutions) of surface-functionalized carbon particle material no. 7 obtained according to Example 2.
Figure 11:
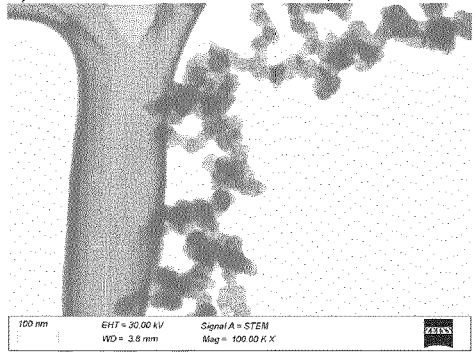
FIG. 11 a) to c) show STEM pictures of precursor materials for surface-functionalized carbon particle materials 1 to 7 as employed in the method described in Examples 1 and 2.
Figure 11:
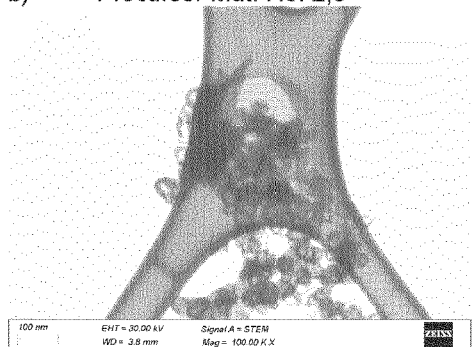
Figure 11:
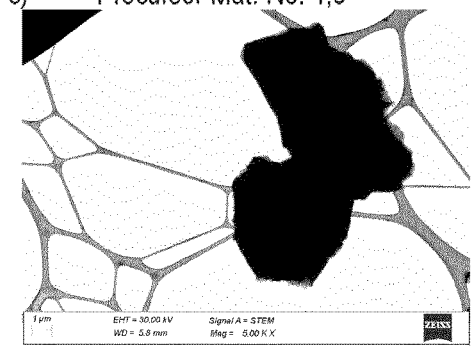
Figure 12:
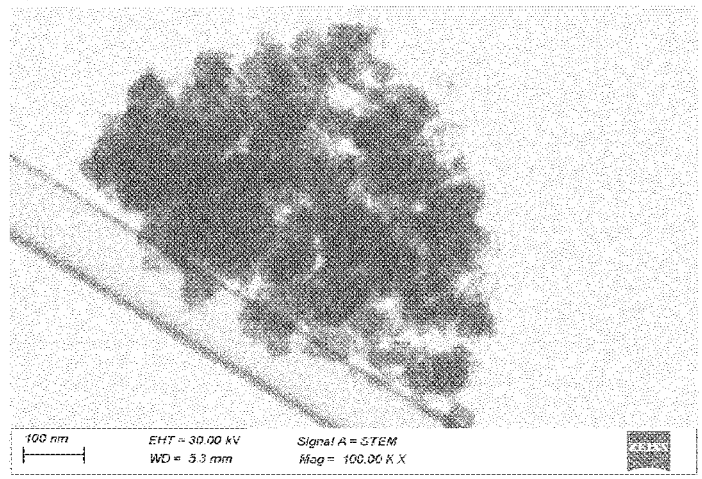
FIG. 12 a) to g) show STEM pictures of the surface-functionalized carbon particle materials no. 1 to 7 obtained according to method described in Examples 1 and 2, respectively.
Figure 12:
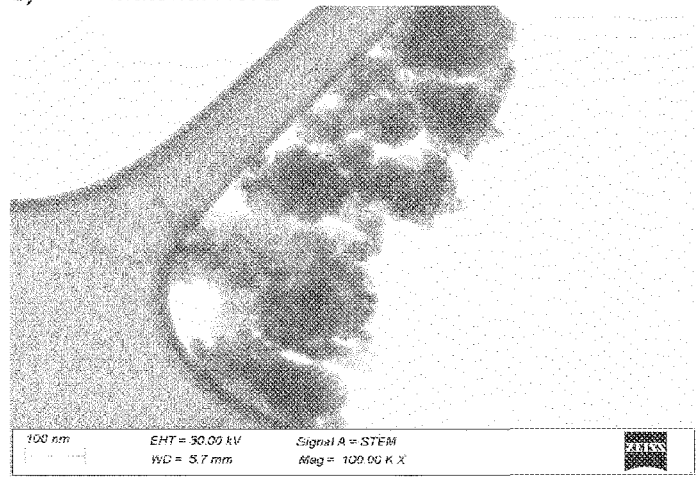
Figure 12:
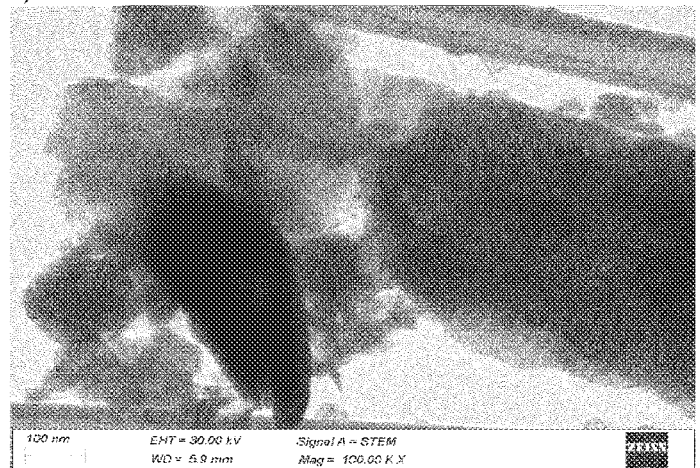
Figure 12:
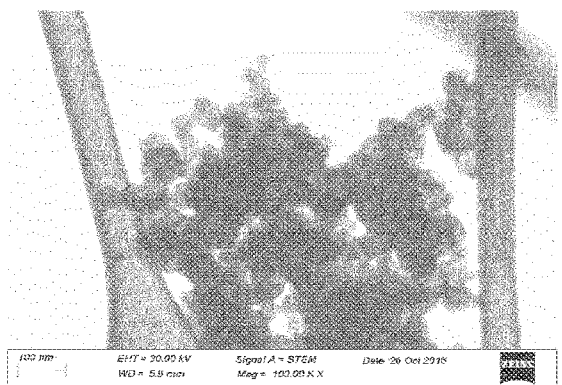
Figure 12:
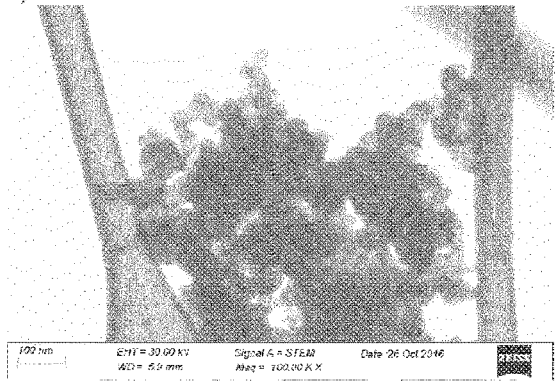
Figure 12:
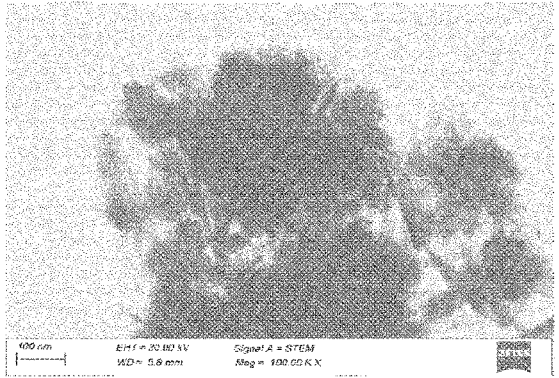
Figure 12:
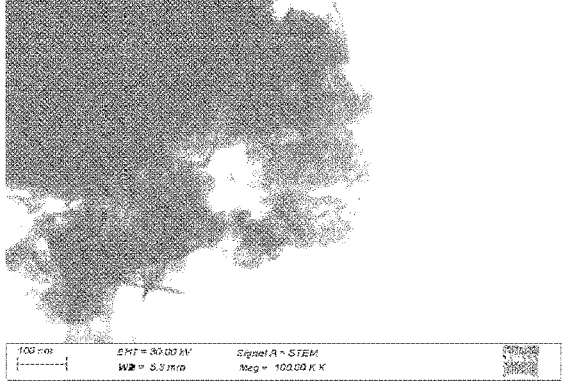

The present disclosure relates to a method for producing novel surface-functionalized carbon particles which comprises the step of applying mechanical forces (such as milling) to a non-graphitic carbonaceous particulate material, followed by a functionalization of the surface of the modified or newly formed particles by controlled oxidation, as well as to the novel surface-functionalized carbon particles obtainable by said method. Also included herein are downstream products and methods employing the novel surface-functionalized carbon particles of the present disclosure.

Methods for Producing Novel Surface-Functionalized Carbonaceous Particles

In a first aspect, the present disclosure relates to a method of preparing surface-functionalized carbon particles, which comprises the steps of:
  a) applying mechanical forces to a non-graphitic carbonaceous material in a gas-tight sealed container; and
  b) functionalizing the resulting modified carbon particles by controlled oxidation.

"Applying mechanical forces" in the present context means that mechanical energy is transferred to the non-graphitic carbonaceous starting material in order to produce particles with a changed particle morphology, which typically includes changing their particle size distribution. Mechanical forces include but are not limited to shock forces, attrition forces and shear forces. One well-known example of how to apply mechanical forces includes "milling", which in the present context should be construed broadly. Thus, it not only includes "classical" milling using well-known mechanicals aids such as ball mills, rotor mills, attrition mills, and the like, but also other types of devices that can convey mechanical forces to the particles to generate particles having a different morphology (e.g. smaller size), such as jet mills or even fluidized bed mills/reactors. Such fluidized bed reactors are capable of accelerating the particles to such an extent that it leads to size modification or crushing upon impact with other particles or the walls of the equipment.

Since the term "applying mechanical forces" includes, but is not limited to milling of the carbonaceous material, it is not mandatory to start from a non-graphitic carbonaceous material in particulate form. Thus, even non-particulate material (such as sheets or other 3-dimensional objects made of a non-graphitic carbonaceous material) can be transformed into particles having the desired size distribution prior to the subsequent functionalization step by controlled oxidation. However, it is easily apparent that the most convenient starting material is still a non-graphitic carbonaceous material in particulate form, as such particles may already be closer to the desired particle size distribution typically envisaged in this method.

As used herein, "controlled oxidation" is a planned and deliberate step to expose the particles obtained from the first step of the method to an oxygen-containing atmosphere under controlled conditions, thereby resulting in the oxidation of the surface of the carbon particles. The controlled oxidation in functionalization step b) therefore leads to carbonaceous particles that are functionalized (i.e. modified) on their surface.

Controlled conditions in the present context means that the particles obtained from step a) are subjected to such oxygen-containing conditions at a defined, i.e. controlled, temperature and for a defined amount of time (either predetermined by some routine experiments, or until a desired level of oxygenation of the particles is achieved).

The controlled oxidation is typically carried out in the presence of air, humidity, oxygen, another oxidizing gas and/or an oxidizing liquid. Examples of such oxidizing gases include, but are not limited to $NO_x$, ozone or carbon dioxide, while oxidizing liquids may include, for example hydrogen peroxide or nitric acid.

For example, the controlled oxidation step can be carried out in an atmosphere of oxygen diluted with nitrogen or another inert gas where the oxygen content is typically between 1 and 50 vol %, preferably between 5 and 30 vol %, and more preferably between 10 and 20 vol %. The upper limit for the oxygen concentration typically depends from the reactivity of the carbon obtained from the first step (which in turn is typically associated with the treatment time for step a)), i.e. carbon particles having a more reactive carbon surface require a lower oxygen content in order to avoid excess heat generation and burn off of carbonaceous material. Optionally, the controlled oxidation may involve bringing the carbonaceous particles in motion within a suitable container (such as a mixer, rotary kiln, or a fluidized bed reactor) in order to achieve a homogenous functionalization of the particles by allowing the particles to contact the reactant gas in an ideal manner. The controlled oxidation of functionalization step b) is thus different from simply storing the material from step a) under atmospheric conditions.

In certain embodiments of the present disclosure, the controlled oxidation is carried out by stirring the material in a mixer. The mixer could be an intensive batch mixer, which serves to mix the material together in a quick, homogeneous and reproducible way. The mixer could also be a paddle batch mixer or a dual shaft paddle batch mixer, for example, which allow a high degree of fluidization of the solid particles facilitating the contact of every carbonaceous particle with the reaction gas (or liquid).

The exposure time for step b) may generally vary widely, depending on the oxygen-containing gas or liquid chosen and the temperature in the container. However, a suitable exposure time may be easily determined by one of skill in the art, depending on the desired parameters of the product, as described above. Some suitable examples of oxidizing gases and reaction conditions for step b) are outlined herein below and in the Working Examples.

Functionalization step b) is, like any oxidation reaction, typically an exothermic reaction, i.e. the temperature in the reactor/container will increase during the contact with oxygen in step b). Accordingly, the temperatures in the reactor, in particular in an atmosphere containing a sizeable amount of oxygen (such as air with about 21 vol % of oxygen), may increase to a level that may eventually lead to a burn-off of carbonaceous material (e.g. as carbon monoxide or even carbon dioxide). The burn-off effect is also affected by the surface area of the carbonaceous material, with a higher surface area leading to a more exothermic oxidation reaction in step b). It may therefore be necessary to cool or maintain the reactor at temperatures low enough to avoid at least a significant burn-off leading, inter alia, to a loss of carbonaceous material.

Alternatively or in addition, it may be useful therefore be advisable to use gases in step b) with a lower oxygen content. Hence, in some embodiments the functionalization step b) includes exposing the particles obtained from process step a) to an atmosphere that comprises less than 20 vol %, or less than 15 vol %, or less than 10 vol %, or less than 8 vol % or less than 6 vol % of oxygen and/or other oxygen-containing gases. As noted above, the reduction of the oxygen content compared to "normal" air atmosphere will lead to a less violent oxidation reaction and thereby to lower temperature increases during functionalization step b), which may limit the burn-off of carbonaceous material under such conditions.

Accordingly, the functionalization step b), i.e. the controlled oxidation, is in some embodiments carried out or at least initiated at a temperature of no greater than 400° C., or no greater than 300° C., or no greater than 200° C., or no greater than 100° C., or no greater than 50° C., or no greater than 30° C. Thus, there will be no or only a very limited burn-off of carbonaceous material as is otherwise observed in surface-modification processes at temperatures above 400-500° C. Nevertheless, as briefly mentioned before, due to the exothermic reaction of the oxygen-containing gas with the (activated) surface of the carbon particles generated in step a), a temperature rise (e.g. to about 150° C. or even more) will often be observed in the mixer, even if there is no external heating applied to the mixture.

In the case of a liquid functionalization process, the resulting product may subsequently be filtered off the liquid and dried after completion of functionalization step b).

It has been found that the oxidation of the non-graphitic carbonaceous particles obtained from step a) can be accomplished even at ambient temperature due to the mechanical activation of the carbon surface under the exclusion of air or humidity (e.g. by grinding the carbonaceous material in a ball or attrition mill in a closed (gas-tight) reactor, possibly, but not necessarily under reduced pressure or in an inert gas atmosphere) in step a). During the mechanical activation step, the morphology of the carbon starting material is transformed into a mesoporous amorphous morphology. Particles with such a morphology permit an elevated amount of surface oxides when exposed to an oxidative reactant after mechanical activation, in some instances even above 1 wt % of the material.

If carbon black is used as starting material, it was observed that the typical carbon black structure disappears after subjecting the starting material to the method described herein. The mechanical activation and formation of the mesoporosity is typically combined with an increase of the BET SSA of the carbonaceous material (see Tables 1 and 2 below). If a high BET SSA of the resulting carbonaceous material is desired, the use of a carbon precursor with high BET SSA can reduce the required milling time. The reduced milling time could reduce the costs of the material as well as the potential decontamination with trace impurities during the milling process.

It was also found that the subsequent functionalization process creates the desired surface "oxide" chemistry and, in addition, appears to saturate the active carbon surface of the carbonaceous particles described herein.

In general, the process involving steps a) and b) will be carried out until the obtained product has the desired product characteristics and the functionalization reaction with the oxidizing reactant is completed (and the surface saturated with chemically absorbed oxygen). For example, in certain embodiments, the process, and in particular functionalization step b), is carried out until the oxygen content (as determined by instrumental gas analysis (IGA) of the resulting particles is more than about 0.6 wt %, or more than about 0.8 wt %, or more than about 1 wt %, or more than about 1.2 wt %.

Alternatively, or in addition, the process is carried out until the pH of an aqueous dispersion comprising the particles obtained from said process is below 5.5, or below 5.3, or below 5.1, or below 5.0, and/or until the pH of an aqueous dispersion comprising the resulting particles is reduced by at least 0.4 pH, or at least 0.6 pH units, or at least 0.8 pH units compared to the starting material employed in step a) of the process.

In some embodiments, the process is, alternatively or in addition, carried out until the BET SSA of the resulting particles is between about 100 m$^2$/g and about 500 m$^2$/g, although said BET SSA value may occasionally also be outside of these values, particularly for starting materials already having a very high BET SSA (such as certain carbon blacks, see Table 1 below for some exemplary embodiments where the starting material, and the final modified material both had a BET SSA of above 500 m$^2$/g).

Alternatively, or in addition, the process is carried out until the xylene density of the resulting particles is between about 1.65 g/cm$^3$ and about 2.1 g/cm$^3$; or between about 1.85 g/cm$^3$ and about 2.00 g/cm$^3$; or between about 1.90 g/cm$^3$ and about 2.00 g/cm$^3$, or between about 1.95 g/cm$^3$ and about 2.00 g/cm$^3$. The process may in certain embodiments also be carried out (alternatively or in addition) until the oil absorption (OA) of the resulting particles is between 70 and 300 mL/100 g and/or until the material exhibits a 5 wt % mass loss by thermogravimetric analysis (TGA) at an onset temperature of below about 580° C., or below about 570° C.

In certain embodiments, especially where ball mills or other mills with metallic milling aids are employed during step a), the process may be carried out until the lead uptake exceeds certain threshold value, such as a lead content of greater than 1,000 ppm, or greater than 2,000 ppm. On the other hand, the lead uptake should in many embodiments also not exceed a certain upper threshold limit, such as 50,000 ppm. Thus, in some embodiments, the process may be carried out until the lead uptake of the resulting particles is such that the final lead content of the particles is between about 2,500 ppm and 40,000 ppm. However, the lead uptake may even be lower, especially when non-metal milling aids and reactor linings are used.

As noted earlier herein, applying mechanical forces in step a) typically can be achieved by "milling". For convenience, step a) may therefore also be referred to as the "milling step", even though it is not strictly limited to milling but includes all techniques that are capable of changing the size and morphology of the non-graphitic carbonaceous material by mechanical energy.

Examples of suitable types of equipment for step a) as described herein include, but are not restricted to sealed (i.e. gas-tight) vibration mills, rocker mills, swing mills, planetary ball mills, drum or tumbling mills, ball mills, attritor or attrition mills (horizontal and vertical), pearl and bead mills, and others. In some embodiments of the invention the sealed reactor used is an attrition mill or a ball mill, such as a rotating mill, a tumbling mill, or a vibration mill. Milling media may vary in shape (e.g. spheres, cylinders, cylpebs, rods, etc.), size and material (e.g. steel, iron, ceramic, $ZrO_2$, $Al_2O_3$, etc.) according to the setup of the individual plant or reactor used.

For example, in vibration mills, the impact forces are generated by the collision of the balls when the drum container is vibrated. Vibration mills are known to work efficiently as impact forces can be generated efficiently at filling degrees even above 90%. This is a milder method compared to milling by a rotating ball mill, for example, which generally apply higher impact and shear forces on the material to be milled (depending on the rotation speed and filling degree). Accordingly, in a vibrating mill the desired product is formed faster while the foreign particle contamination remains lower due to a lower abrasion of the balls and inner walls of the milling compartment. The contamination with metal impurities therefore stays low but can of course be totally excluded by using non-metal based balls and linings.

Thus, the milling media used in the mill can, according to an embodiment of the invention, be made of non-metallic materials such as $ZrO_2$, $Al_2O_3$ or ceramic. Optionally, the mill may be fitted with an internal non-metal lining, preventing further metal contamination of the particles.

Additionally, in many embodiments of this aspect of the invention, the milling step a) is carried out for at least 5 or at least 10 or at least 15 hours, but typically not longer than 150 hours, or not longer than 96 hours, or not longer than 84 hours, or not longer than 72 hours or not longer than 60 hours although other milling times may of course also achieve suitable results (depending on the specific equipment used). A typical milling process involves the mechanical treatment of a non-graphitic carbonaceous material, ideally with high purity, in a gas-tight sealed ball mill or vibration mill.

In certain embodiments, the filling degree of the ball mill should be below 75%, or below 80% and the rotation speed of the mill has to be high enough so that the balls are transported to the drum cylinder top and fall on the graphite/ball mass in the bottom of the drum to maximize the impact forces versus the shear forces on the treated particles.

Overall, the skilled person will be aware that the main milling parameters may have to be re-adjusted to achieve the high surface area or other desired product specifications targeted within industrially "acceptable" time limits, i.e. in order to reduce milling time, carbon material batch size, milling media type, size and shape, mill filling factor and weight ratio (carbon-to-milling media) will have to be optimized for every specific type of equipment selected by carrying out, if necessary, some routine experiments.

In any event, the milling step in some embodiments is carried out until the resulting particles are characterized by
i) a particle size distribution (PSD) having a $D_{50}$ value of between 1.0 µm and 8.0 µm, preferably between 1.0 µm and 5.0 µm; and/or
ii) a particle size distribution (PSD) having a $D_{90}$ value of between 12 µm and 70 µm, preferably between 15 µm and 40 µm; and/or
iii) a particle size distribution (PSD) having a $D_{10}$ value of between 0.4 µm and 1.5 µm, preferably between 0.5 µm and 1.2 µm; and/or
iv) the DFT mesopore area/BET SSA ratio is below about 0.15, or below about 0.12, or below about 0.10; and/or
v) a DFT micropore area/BET SSA ratio of above about 0.25, or above about 0.30, or above about 0.32.

All particle size (PSD) values above were determined by laser diffraction using a dry dispersion method as specified in more detail in the Methods section below. Thus, the $D_{10}/D_{50}/D_{90}$ values therefore may relate to agglomerated forms of finer primary particles.

The processing time in step a) obviously depends on the equipment and is mainly governed by the desired properties of the resulting particles. However, if the mechanical forces in step a) are applied by milling, suitable milling times may in certain embodiments typically range between about 10 h and about 60 h, or between about 15 h and about 50 h, In certain embodiments, the milling step is carried out until the particle size of the non-graphitic starting material is such that the fine particles start to (re-)agglomerate into larger, typically more spherical, agglomerates due to their activated (i.e. energy-rich) surface. Accordingly, process step a) may in fact serve to create new synthetic carbonaceous (non-graphitic) particles in agglomerated form. These particles are subsequently functionalized in controlled oxidation step b). The carbonaceous starting material is therefore in some embodiments transformed into a novel carbonaceous material having a mesoporous amorphous morphology with an elevated amount of surface oxides above about 0.6 wt %, or above about 0.8 wt % or even above about 1 wt %. In the case of carbon black used as a starting material, it has been found that the typical carbon black structure disappears after being subjected to the method of the present disclosure.

Since step a) is carried out in a gas-tight container, there is typically no need for either evacuating the container/reactor (such as a mill) or even purging it with an inert gas, not the least because the remaining oxygen in the reactor will be quickly consumed by the carbonaceous material. Gases are typically adsorbed quickly on the surface of the particles, although chemical reactions may also take place, especially for oxygen at higher temperatures generated during the impact of mechanical energy and/or external heating (mostly forming carbon monoxide). In some embodiments, the amount of oxygen in the reactor/mill is less than 0.5 wt %, or less than 0.2 wt %, or less than 0.05 wt % based on the total weight of the carbonaceous material.

It may sometimes be advantageous to hold the carbonaceous particles obtained in step a) in the gas-tight sealed reactor for at least 15 minutes, or at least 30 minutes, or at least 45 minutes before carrying out step b). This holding period may serve to complete the agglomeration of the milled finer carbonaceous particles having a high surface energy believed to be due to the activation of the surface upon the application of mechanical forces during step a).

The term "non-graphitic carbonaceous material" as used herein generally refers to any carbonaceous material that lacks the properties and structure of graphite, such as an $L_c$ value below about 10 nm, a c/2 value above about 0.3365 nm, and/or a Xylene density of below about 2.2 g/cm$^3$.

In any event, the method described herein can be carried with any non-graphitic starting material, such as carbon black, petroleum coke, calcined petroleum coke, needle coke, coal tar based coke, anthracite, calcined anthracite, charcoal derived from polymers, biomass, pyrolytic carbon and mixtures thereof.

Although the method described herein is mainly useful for non-graphitic starting materials such as those listed in the preceding paragraph, the present method may optionally also be carried out with carbonaceous materials that include a certain amount of graphitic material mixed with the non-graphitic starting material. Suitable graphite materials to be mixed with the non-graphitic starting material include, but are not limited to natural graphite, synthetic graphite, graphitized coke, graphitized anthracite or mixtures thereof.

Thus, in certain embodiments, the method described herein can be carried out with a carbonaceous starting material composition where the non-graphitic carbonaceous material is mixed together with about 10 wt % to about 90 wt %, or about 20 wt % to about 80 wt %, or about 10 wt % to 50 wt % of a graphitic carbon material prior to the milling carried out in step a), or prior to the functionalization step b), see for example the materials prepared in Examples 1 and 2 (properties listed in Tables 1 and 2).

It was found that the surface-functionalized (such as surface-oxidized) carbonaceous particles obtainable by the method as described herein show a very good affinity to lead and support the electrochemical deposition of lead. It was found that the lead uptake typically correlates with the surface-oxide content of the particles, i.e. the higher the surface oxide concentration the higher is the lead uptake. The novel carbon particles can be integrated in the lead structure of negative plates of lead acid batteries where they contribute to the reversible formation of lead sulfate.

The particles may therefore be used as additives that can improve the cycling stability of lead acid batteries operated in the high current partial state of charge operation mode of advanced lead acid batteries used in a car to support the start/stop function. They may also improve the charge acceptance of advanced lead acid batteries needed for the storage of generated electricity from the operation of the brakes.

The carbonaceous particles obtained from the method described herein can be agglomerated or non-agglomerated particles, depending mainly, but not exclusively, on the primary particle size after step a), where primary particles below a certain size tend to form agglomerated, typically rather isotropic particles due to the high surface energy generated in milling step a).

Carbonaceous particles obtained from step b) (functionalization by controlled oxidation) are typically obtained in dry form (unless a liquid oxidizing agent is used, in which case the material may be dried). The dry particles can then be used in a number of downstream applications, as described in more detail herein below.

In some instances, however, the method includes an additional step wherein the particles form step b) are subsequently dispersed in a liquid, such as water, alcohol or a mixture thereof (water or water ethanol mixtures are preferred for environmental reasons). The suspension may optionally further include one or more than one dispersant, for example PEO-PPO-PEO block copolymers such as Pluronic PE 6800®, which is available from BASF AG. Alternative dispersing agents are ionic dispersants like sulphonates such as Morwet EFW® from AkzoNobel, or non-ionic dispersants like alcohol polyethoxylates such as Emuldac AS 25® from Sasol, or alkyl polyether such as Tergitol 15-S-9® from Dow Chemical, n-alkyl polyethylene oxide, polyethylene glycol, iso-alkyl polyethylene oxide or polyethylene glycol or any other dispersants known to skilled people in the fields of pigment dispersion, and/or one or more polymer binder compounds, such as polyacrylates, polyurethanes, styrene butadiene rubber, acryl butadiene rubber, polyvinylacetates, or polyvinylchloride.

Novel Surface-Functionalized Carbonaceous Particles

A further aspect of the present disclosure relates to surface-functionalized carbon particles having a crystallographic $L_c$ value of less than about 14 nm, or less than about 12 nm, or less than about 10 nm; and an oxygen content greater than about 0.6 wt %, or greater than about 0.8 wt %, or greater than about 1 wt %.

As already noted earlier when describing the method, the novel carbonaceous particles may in view of their limited crystallite size $L_c$ be characterized as non-graphitic carbonaceous particles. However, the novel carbonaceous material may in certain embodiments also encompass materials obtained from mixing non-graphitic and graphitic particles prior to step a) or step b). In these cases, the crystallographic $L_c$ value may in certain instances exceed the cut-off values of less than about 14 nm, especially for materials made from mixtures comprising a sizeable quantity of graphitic particles. Preferably, however, such materials will likewise be characterized by an overall crystallographic $L_c$ value of less than 14 nm, or less than 12 nm, or less than 10 nm, as set out in the preceding paragraph.

In some embodiments, the surface-functionalized carbon particles according to the present invention may be obtainable by the method described in the present disclosure.

As noted above, the surface-functionalized carbonaceous particles are generally characterized by an increased concentration of chemisorbed oxygen-groups on the carbon surface, which may therefore be referred to herein as "surface oxides". Thus, the oxygen content of the surface-functionalized carbonaceous particles, as measured according to the method set out below in the Methods section, is at least about 0.60 wt %, or at least 0.70 wt %, or at least about 0.80 wt %, or at least about 0.85 wt %, or at least about 0.90 wt %, or at least about 1.0 wt %, or at least about 1.20 wt %, and typically no greater than about 5 wt %, or no greater than 4 wt %. As can be seen from Table 1 in the Examples section, all starting materials had an oxygen content of (mostly well-)below 0.60 wt %. Since some of the oxygen groups on the surface of the particles are effectively carboxyl groups, it is not surprising that in most embodiments, the surface-functionalized carbonaceous particles have an acidic pH, i.e. a pH of below 7.0, and mostly even below about 5.5.

Without wishing to be bound by theory, the concentration of "surface oxides" appears to be especially relevant for the affinity of the particles to lead. This is particularly important when using the surface-functionalized carbonaceous particles as conductive additives in the negative electrode of, for example, a lead acid battery. Furthermore, the combination of special carbon morphology and high concentration of "surface oxides" would appear to yield excellent lead plating properties.

The surface-functionalized carbonaceous particles according to the present disclosure may in some instances be further characterized by any one of the following parameters (alone or in any combination):

i) a BET surface area greater than about 100 m²/g; or greater than about 110 m²/g, or greater than about 120 m²/g, optionally a BET SSA of between about 100 m²/g and about 500 m²/g, or about 110 m²/g and about 400 m²/g, or about 120 m²/g and about 350 m²/g; and/or ii) an intraparticle pore volume of less than about 2 mL/g, or less than about 1.8 mL/g;

iii) a total pore volume less than about 3 mL/g, or less than about 2.5 mL/g; and/or iv) a lead uptake of greater than about 1000 ppm, or greater than about 2,000 ppm, or greater than about 2,500 ppm, or greater than about 2,800 ppm; and/or v) a pH of an aqueous dispersion comprising the particles of below about 5.5, or below about 5.3, or below about 5.1. or below about 5.0; and/or vi) a 5 wt % mass loss by thermogravimetric analysis (TGA) at an onset temperature of below about 580° C., or below about 570° C.; and/or vii) an oil absorption (OA, Marcol) of less than about 500 ml/100 g or less than about 400 ml/100 g, or less than about 300 ml/100 g; or less than about 250 ml/100 g; or between about 70 and about 300 ml/100 g, or between about 70 and about 260 ml/100 g.

Owing to the particular morphology of the surface-functionalized carbonaceous material, the oil absorption is typically significantly lower than other carbon materials with comparable pore volume and BET SSA, e.g. carbon black, coke or activated carbon.

The surface-functionalized carbonaceous particles may in some embodiments be further characterized, alternatively or in addition, by a particle size distribution (PSD, measured by laser diffraction using a dry dispersion method) of
 i) a particle size distribution (PSD) having a $D_{50}$ value of between about 1.0 µm and about 8.0 µm, optionally between about 1.0 µm and about 5.0 µm; and/or
 ii) a particle size distribution (PSD) having a $D_{90}$ value of between about 12 µm and about 70 µm, optionally between about 15 µm and about 40 µm; and/or
 iii) a particle size distribution (PSD) having a $D_{10}$ value of between about 0.4 µm and about 1.5 µm, optionally between about 0.5 µm and about 1.2 µm.

Moreover, the surface-functionalized carbonaceous particles may in some instances be further characterized by
 a DFT mesopore area/BET SSA ratio of below about 0.15, or below about 0.12, or below about 0.10; and/or
 a DFT micropore area/BET SSA ratio of above about 0.25, or above about 0.30, or above about 0.32.

It will be understood that any of the above additional parameters can be used, alone or in combination with another one or more of those parameters, to define the novel surface-functionalized carbonaceous particles described herein.

In certain embodiments, the novel surface-functionalized carbonaceous particles will be present in agglomerate form wherein sub-micron non-agglomerated particles are attached together to form the agglomerate micro-structures. These agglomerates (micro-structures) have been found to act as "hosts" with a good mechanical stability, e.g. for use in sulfur cathodes in lithium sulfur batteries.

Since the milling step a) often leads to the formation of agglomerated, fairly isotropic particles, it is not surprising that in many instances, the Scott density of the novel surface-functionalized carbonaceous material will typically be fairly high. Accordingly, in many embodiments the Scott density of the carbonaceous material will range from 0.15 to 0.5 g/cm$^3$, or from 0.20 to 0.45 g/cm$^3$, which is typically much higher compared to the (unmodified) starting material.

For some embodiments, the surface-functionalized carbonaceous particles can be further characterized by an iron (Fe) content value of below 500 ppm, or below 400 ppm, or below 300 ppm, or below 200 ppm, or below 160 ppm. In some embodiments, particularly where non-metal milling media are used in the milling step, e.g. milling media made from $ZrO_2$, $Al_2O_3$ or ceramic materials, the surface-functionalized carbonaceous particles may even be characterized by an Fe content value of below 50 ppm, or below 10 ppm, or below 5 ppm.

In relation to the crystal structure, the surface-functionalized carbonaceous particles have in certain embodiments a crystallite size $L_a$ (as measured by Raman spectroscopy) from 1 to 10 nm, or from 3 to 8 nm, or from 4 to 6 nm.

The crystallographic c/2 value of the surface-functionalized carbonaceous particles was found to be relatively unaffected by the method (i.e. the milling and functionalization steps). Thus, the c/2 value is mostly determined by the c/2 of the starting material, although it has been observed that the c/2 value upon undergoing the treatment steps described herein is typically slightly increased compared to the starting material (see Table 1 below). Since the particles are typically made starting from non-graphitic material, c/2 values will mostly be above 0.3400 nm, or more than 0.3450, or even more than 0.3500 nm.

Polymer Compounds Filled with Surface-Functionalized Carbonaceous Particles

Polymer compounds filled with the surface-functionalized carbon particles described herein are another aspect of the present invention, showing excellent electrical and thermal conductivity along with good mechanical properties. Examples of polymers can be, but are not limited to, polypropylene, polyethylene, polystyrene, polyamide, polyimide, polyphenylene sulfide, polyethylether ketone, and elastomers such as synthetic or natural rubber. It has been observed that the surface-functionalized carbonaceous particles can in most cases be used directly, i.e. as agglomerates, for preparing the filled polymer compound as it has been observed that typical extrusion processes apply sufficient shear stress so as to disperse the agglomerates into the primary (or at least finer) particles which are then stabilized in the polymer.

Use of Surface-Functionalized Carbonaceous as Additives in Battery Electrodes

Because the surface-functionalized carbonaceous particles as described herein exhibit excellent electrochemical properties, a battery electrode comprising the surface-functionalized carbon particles as a conductive additive represents a further aspect of the invention. Due to the sub-micron particle size of the primary particles, the present carbon particles exhibit favorable properties, particularly in electrodes containing sub-micron size electrode materials.

In some embodiments, the battery electrode material may additionally include barium sulfate, which is known to prevent lead sulfate deposition as a thin passivating film on the surface of the electrode material by acting itself as a (chemically inert) site for lead sulfate precipitation. Typically, barium sulfate is used at an average particle size of about 1 µm though it may also function with particle sizes slightly larger than 1 µm.

In such embodiments, the barium sulfate is added in an amount of about 0.2 to about 2%, preferably 0.5 to 1.5% or 0.7 to 1.3%, and most preferably at about 1% by weight of the total mass of the electrode (see, for example, Boden, J. Power Sources 73 (1998), pp. 89-92).

In addition, or alternatively, such battery electrodes may contain, besides the surface-functionalized carbonaceous particles and possibly barium sulfate, also lignosulfonates as a further additive. Lignosulfonates are complex aromatic polyethers and are known to prevent flocculation of the lead particles due to their amphiphilic nature where the large hydrophobic organic moiety is adsorbed onto the surface of the lead particles while the hydrophilic inorganic component is in touch with the aqueous electrolyte phase, thereby preventing the particles from coalescing or even sintering (see, for example, again Boden, J. Power Sources 73 (1998), pp. 89-92).

In such embodiments, the lignosulfonates are typically added in an amount of about 0.1 to about 1.5%, preferably 0.3 to 1.0% and most preferably at about 0.75% by weight of the total mass of the electrode.

Carbon, barium sulfate and lignosulfates are commonly used as additives and collectively referred to as "expanders". Thus, a further embodiment of the invention relates to mixtures of the surface-functionalized carbonaceous particles with one or more lignosulfonates and/or barium sulfate. Such mixtures can for example be used as an additive for the negative electrode of lead acid batteries.

The use of the battery electrodes containing the surface-functionalized carbonaceous particles, and, optionally the barium sulfate and/or lignosulfates, in lead acid batteries is yet another aspect of the invention. The surface-functionalized carbonaceous particles described herein are suitable for plating lead, which is believed to be due to the high mesopore content and surface "oxide" group chemistry of the surface-functionalized carbonaceous particles. Moreover, compared with other carbons having a similar surface area a better resistivity against oxidative corrosion and electrolyte decomposition in lead acid batteries has also been observed for the carbonaceous particles described herein. In addition, the increased concentration of superficial oxide surface groups causes a more polar carbon surface and therefore increases of the carbons' hydrophilicity. This improved wetting of the carbonaceous surface in aqueous media leads to advantages in the manufacturing process of the negative electrode mass as the carbonaceous, compared to typical graphite or carbon black, mixes more readily into the aqueous paste of lead oxide and other negative electrode components.

In a further embodiment of this aspect, the battery electrodes containing the surface-functionalized carbonaceous particles can be used as positive electrodes of lithium sulfur batteries. Due to the micro-structure of the surface-functionalized carbonaceous particles, they may act as a host for the sulfur acting as the electrochemically active component in the positive electrode. It has been found that positive electrodes containing sulfur absorbed within the microstructure of the surface-functionalized carbonaceous particles show excellent mechanical stability and resistivity against oxidative corrosion.

In yet another embodiment of the invention, the battery electrode described herein can be used as an electrochemical double layer capacitor. In some embodiments the electrochemical double layer capacitors have an average capacitance of above 7 F/g, or above 6 F/g, or above 5.5 F/g.

Use of Surface-Functionalized Carbonaceous Particles as Catalyst Supports

The use of the surface-functionalized carbon particles defined herein as carbon supports represents another aspect of the invention. When used as carbon support, or skeleton, e.g. in air electrodes used in fuel cells and metal air electrodes, the metal or metal oxide catalysts can be finely dispersed on the amorphous carbon surface. It is thought that the surface oxides and pores function as anchor points to stabilize the catalyst finely dispersed on the carbon surface, which appears to suppress any segregation effects during preparation and operation. The high and homogeneous dispersion of the metal catalyst cannot be achieved in typical graphite powders, which is thought to be at least in part due to the absence of the aforementioned surface morphology exhibited by the carbonaceous particles as described herein.

Dispersions of Surface-Functionalized Carbonaceous Particles

A dispersion of the surface-functionalized carbon particles described herein in a liquid, optionally in the presence of a dispersant that aids in forming colloidal carbon dispersions represents another aspect of the present invention. These dispersions can be obtained by a process involving cleaving the (typically agglomerated) particles obtained from the functionalization step by applying energy mainly in the form of shear forces and stabilizing the primary particles by using dispersants in liquid polar media, such as water, alcohols (methanol, ethanol, propanol) or mixtures thereof.

This dispersion process thus represents a further embodiment of this aspect of the invention. This dispersion process can, for example, be carried out in an attrition mill. It appears that the polar surface morphology of the carbonaceous particles facilitates the wetting process with water or polar solvents, which aids the preparation of colloidal carbon dispersions. Accordingly, another related aspect relates to the use of the surface-functionalized carbon particles described herein to form a dispersion in a liquid in the presence of a dispersant by applying shear force to deagglomerate the particles. Examples of suitable dispersants that can be used include, but are not limited to the dispersants already referenced above.

The dispersions described hereinabove can for example be used as a base for conductive coatings.

Measurement Methods

The percentage (%) values specified herein are by weight, unless specified otherwise.

Specific BET Surface Area, DFT micropore and mesopore Volume and Area

The method is based on the registration of the absorption isotherm of liquid nitrogen in the range $p/p0=0.04\text{-}0.30$, at 77 K. The nitrogen gas adsorption is performed on a Micromeritics Tristar device. Following the procedure proposed by Brunauer, Emmet and Teller (Adsorption of Gases in Multimolecular Layers, *J. Am. Chem. Soc.*, 1938, 60, 309-319), the monolayer capacity can be determined. On the basis of the cross-sectional area of the nitrogen molecule, the monolayer capacity and the weight of sample, the specific surface can then be calculated. The isotherm measured in the pressure range $p/p0$ $10^{-5}-1$ (done with a Micromeritics ASAP2020 device), at 77K are measured and processed with DFT calculation in order to assess the pore size distribution, micro- and meso-pore volume and area.

Reference: Ravikovitch, P., Vishnyakov, A., Russo, R., Neimark, A., Langmuir 16 (2000) 2311-2320; Jagiello, J., Thommes, M., Carbon 42 (2004) 1227-1232.

Particle Size Distribution (PSD)

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. The method yields the proportion of the total volume of particles to a discrete number of size classes forming a volumetric particle size distribution (PSD). The particle size distribution is typically defined by the values $D_{10}$, $D_{50}$ and $D_{90}$, wherein 10 percent (by volume) of the particle population has a size below the $D_{10}$ value, 50 percent (by volume) of the particle population has a size below the $D_{50}$ value and 90 percent (by volume) of the particle population has a size below the $D_{90}$ value. Measurements were performed on a Sympatec Helos system with a dry type measurement cell.

The particle size distribution of coarse graphite is determined by sieve analysis using a vibrated sieve or airjet sieve. The particle size distribution is determined by the material amount with a particle size being larger than the mesh size of the sieve applied.

Thermogravimetric Analysis (TGA)

The determination of the percentage of mass loss of any carbonaceous material is performed by using conventional thermogravimetric equipment (TGA). A sample of ca. 20-30 mg was used for the measurements. The atmosphere in the thermogravimetric equipment is air with a flow rate of 10 mL/min (with initial purging of 30 mL/min) with a heating rate of 10° C./min up to 1200° C.

Oxygen Content

Oxygen mass fractions in solid samples are evaluated using the principles of inert gas fusion or solid carrier gas heat extraction (IGA). The sample is placed in a graphite crucible and inserted into an electrode furnace. The crucible is maintained between the upper and lower electrodes of an impulse furnace. A high current passes through the crucible after purging with inert gas (He or Ar) creating an increase of the temperature (above 2500° C.). Gases generated in the furnace are released into flowing inert gas stream. The gas stream is then sent to the appropriate infrared (O as CO by NDIR) or thermal conductivity (N and H by TCD) detectors for measurement. Instrument calibrations are performed using known reference materials.

pH Value

A sample of 1.5 g of carbon is dispersed in 50 mL distilled water with the aid of a few drops of acetone and of an ultrasonic treatment. The electrode of the calibrated pH meter is placed in the slurry. After a stabilization time of 2 minutes the slurry is stirred and the pH value is recorded to the nearest 0.05 unit.

Reference: ASTM D1512-95 (method B))

Xylene Density

The density is obtained by xylene displacement. Approx. 2.5 g (accuracy 0.1 mg) of powder is weighed in a pycnometer. Xylene is added under vacuum. After a few hours dwell time under normal pressure, the pycnometer is filled up, conditioned and weighed. The density represents the ratio between mass of graphite and the displaced volume of xylene. The value is reported in g/cm$^3$.

References

ISO 8004 Carbonaceous materials for the production of aluminium—calcined coke and calcined carbon products. Determination of the density in xylene by a pyknometric method ISO 9088 Carbonaceous materials used for the production of aluminium—Cathode blocks and prebaked anodes—Determination of the density in xylene by a pyknometric method DIN 51901 ("Prüfung von Kohlenstoffmaterialien—Bestimmung der Dichte nach dem Xylolverfahren")

ASTM D5004 (Standard Test Method for Real Density of Calcined Petroleum Coke by Xylene Displacement)

Tapped Density 100 g of dry graphite powder is carefully poured into a graduated cylinder. Subsequently, the cylinder is fixed on the off-centre shaft-based tapping machine and 1500 strokes are run. The reading of the volume is taken and the tap density is calculated. Reference: DIN-ISO 787-11

Scott Density

Dry carbon powder is passed through the Scott volumeter and is subsequently collected in a 16.39 cm$^3$ (1 in$^3$) vessel and weighed to a 0.1 mg accuracy. The Scott density is calculated from the ratio of weight and volume.

Reference:-ASTM B 329-98 (2003)

Oil Absorption

The oil absorption test is a means to determine the general behavior of graphite and graphite-type materials in respect of absorption of liquids. A slow filter paper is placed into a centrifuge metal tube having an inner diameter of 13.5 mm and a sieve on the bottom (18 mesh). In order to wet the filter, 0.5 g of paraffinic oil is filled into the tube and centrifuged for 30 minutes at 521 g (1 g=9.81 m/s2, corresponding to 1500 rpm in the Sigma 6-10 centrifuge). After the wetting procedure, the tube is weighed and 0.5 g of graphite powder is added. The graphite is covered with 1.5 g of paraffinic oil and centrifuged for 90 minutes at 521 g. After centrifuging, the tube is weighed and the oil absorption per 100 g of graphite powder is calculated on the basis of the weight increase.

Metal Concentration (for Iron and Lead in Carbon Samples)

This analysis is performed by an SDAR OES simultaneous emission spectrometer. Carbon powder, ground to a maximum particle size of 80 μm by means of a vibrated mill is compacted to a tablet. The sample is placed onto the excitation stand under argon atmosphere of the spectrometer. Subsequently the fully automatic analysis can be initiated. Reference: (i) K. Slickers *Automatic Emission Spectroscopy* Brühl Druck und Presshaus Giessen (D) (1992), (ii) M. Wissler und P. Gebhardt Protokoll der 29. Sitzung des Unterausschusses Feststoffe im Arbeitskreis Kohlenstoff der Deutschen Keramischen Gesellschaft (12./13. Dez 1984)

Crystallite Size $L_a$

Crystallite size $L_a$ is calculated from Raman measurements using equation:

$$L_a[\text{Angstrom (Å)}]=C\times(I_G/I_D)$$

where constant C has values 44 [Å] and 58 [Å] for lasers with wavelength of 514.5 nm and 632.8 nm, respectively. $I_G$ and $I_D$ are the intensity of the G- and D-band Raman absorption peaks at 1580 cm$^{-1}$ and 1320 cm$^{-1}$, respectively.

Raman analyses were performed using a LabRAM-ARAMIS Micro-Raman Spectrometer from HORIBA Scientific with a 632.8 nm HeNe LASER.

Crystallite Size $L_c$

Crystallite size $L_c$ is determined by analysis of the (002) and (004) X-ray diffraction profiles. For the present invention, the method suggested by Iwashita (N. Iwashita, C. Rae Park, H. Fujimoto, M. Shiraishi and M. Inagaki, Carbon 42, 701-714 (2004)) is used. The algorithm proposed by Iwashita has been specifically developed for carbon materials. The widths of the line profiles at the half maximum of sample and reference are measured. By means of a correction function, the width of pure diffraction profile can be determined. The crystallite size is subsequently calculated by applying Scherrer's equation (P. Scherrer, Gottinger-Nachrichten 2 (1918) p. 98).

Interlayer Spacing c/2

The interlayer space c/2 is determined by X-ray diffractometry. The angular position of the peak maximum of the (002) diffraction profiles are determined and, by applying the Bragg equation, the interlayer spacing is calculated. The carbon sample is mixed with a silicon standard. A mixture of polyglycol and ethanol is added in order to obtain a highly viscous slurry. Subsequently, a thin layer of approx. 150 μm is applied to a glass plate and dried. A Cu Kα X-ray beam is used.

Reference: Klug and Alexander, X-Ray diffraction Procedures John Wiley and Sons Inc., New York London (1967)

Lead Uptake

A 10 wt % dispersion of carbonaceous material in 1M aqueous Pb(NO$_3$)$_2$ is stirred for 24 h. It is then filtered and the remaining carbon is repeatedly washed with deionized water and then dried. BET surface area and Pb content is measured on the dry carbon according to the methods described above.

SEM Images

Images with a scanning electron microscope (Zeiss Sigma) were taken at 10,000 and 50,000 magnification (reference Polaroid 545) with 1 kV accelerating voltage and a working distance between 2 and 3 mm with Inlens detector and at 100,000 magnification (reference Polaroid 545) with 30 kV accelerating voltage and a working distance between 5.5 and 6 mm with STEM detector.

Mercury Intrusion Porosimetry

The method is based on the measurement of the amount of mercury intrusion versus the pressure applied to a sample immersed in mercury. On the basis of the applied pressure, the surface tension of mercury and the contact angle between mercury and the solid surface, the pore size can be calculated. The experiments were performed on a sample (ca. 0.1-0.3 g) over the pressure range of 0.5-4000 bar using a Micromeritics Autopore V machine. For data processing, a contact angle of 130° and a surface tension of $485\times10^{-3}$ N/m were used.

Powder Conductivity, Compressibility, and Compression Work

A powder sample is pressed in a die and simultaneously a current passes through the sample via the anvil and the piston of the die. The body of the die is insulating. Pressure, force, sample thickness, and voltage are measured while compressing the sample. Specific resistivity is calculated as following:

$$\rho(P) = \frac{A \cdot V(P)}{i \cdot t(P)}$$

where $\rho(P)$ is the specific resistivity as a function of the pressure, A is the cross section area of the samples, i is the applied current, V(P) is the established voltage difference, and t(P) is the thickness of the sample. For comparison purposes $\rho(P)$ is reported as a function of sample density calculated as following:

$$\varrho(P) = \frac{m}{A \cdot t(P)}$$

where $\varrho$ (P) is the density of the sample and m is its mass. The mechanical work for compression is calculated as $$E_i = \sum_{j=1}^{i} p_j S(h_{j-1} - h_j)$$

where E is the mechanical work of compression, $\rho$ is the pressure, S is the cross section area and h is the thickness (N. Probst, E. Grivei, Carbon 40 (2002) 201-205).

Powder Conductivity of Mixtures

Resistivity of mixtures of carbon and another material is measured according to the method above. Resistivities at the pressure of 4.5 kNcm$^{-2}$ for different mixtures are plotted as a function of the carbon concentration.

The present invention can also be described by reference to the following numbered items:

1. A method of preparing surface-functionalized carbon particles, comprising the steps of:
    a) applying mechanical forces to a non-graphitic carbonaceous material in a gas-tight sealed reactor; and
    b) functionalizing the resulting modified carbon particles by controlled oxidation.
2. The method according to item 1, wherein the process is carried out until
    i) the oxygen content (IGA) of the resulting particles is more than about 0.8 wt %, preferably more than about 1 wt %; and/or
    ii) the pH of an aqueous dispersion comprising the resulting particles is below 5.5, or below 5.3, or below 5.0; and/or
    iii) the pH of an aqueous dispersion comprising the resulting particles is reduced by at least 0.4 pH, or at least 0.6 pH units, or at least 0.8 pH units.
3. The method according to item 1 or item 2, wherein the process is carried out until the BET SSA of the resulting particles is between about 100 m$^2$/g and about 500 m$^2$/g.
4. The method according to any one of items 1 to 3, wherein the process is carried out until
    i) the xylene density of the resulting particles is between about 1.65 g/cm$^3$ and about 2.1 g/cm$^3$; or between about 1.85 g/cm$^3$ and about 2.00 g/cm$^3$; or between about 1.95 g/cm$^3$ and about 2.00 g/cm$^3$; and/or
    ii) the oil absorption (OA) of the resulting particles is between 70 and 300 ml/100 g; and/or
    iii) the lead uptake of the resulting particles is between 2500 ppm and 40000 ppm; and/or
    iv) the resulting particles exhibit a 5 wt % mass loss by thermogravimetric analysis (TGA) at an onset temperature of below about 580° C., or below about 570° C.
5. The method according to any one of items 1 to 4, wherein the resulting particles are characterized by
    i) a particle size distribution (PSD) having a $D_{50}$ value of between 1.0 µm and 8.0 µm, preferably between 1.0 µm and 5.0 µm; and/or
    ii) a particle size distribution (PSD) having a $D_{90}$ value of between 12 µm and 70 µm, preferably between 15 µm and 40 µm; and/or
    iii) a particle size distribution (PSD) having a $D_{10}$ value of between 0.4 µm and 1.5 µm, preferably between 0.5 µm and 1.2 µm; and/or
    iv) the DFT mesopore area/BET SSA ratio is below about 0.15, or below about 0.12, or below about 0.10; and/or
    v) a DFT micropore area/BET SSA ratio of above about 0.25, or above about 0.30, or above about 0.32.
6. The method according to any one of items 1 to 5, wherein the treatment time in step a) is between about 10 h and 60 h, or between about 15 h and about 50 h.
7. The method according to any one of items 1 to 6, wherein the product from step a) is held in the gas-tight sealed reactor for at least 15 minutes, or at least 30 minutes, or at least 45 minutes before carrying out step b).
8. The method according to any one of items 1 to 7, wherein the controlled oxidation is carried out in the presence of air, humidity, oxygen, another oxidizing gas and/or an oxidizing liquid, wherein the oxidizing gas is NO$_x$, ozone or carbon dioxide and the oxidizing liquid is hydrogen peroxide or nitric acid.
9. The method according to any one of items 1 to 8, wherein the functionalization step b) involves exposing the particles obtained from step a) to an atmosphere that comprises less than 20 vol %, or less than 15 vol %, or less than 10 vol % of oxygen and/or oxygen-containing gases.
10. The method according to any one of items 1 to 9, wherein the non-graphitic carbonaceous material used in step a) is selected from carbon black, petroleum coke, calcined petroleum coke, needle coke, coal tar based coke, anthracite, calcined anthracite, char coal derived from polymers, biomass, pyrolytic carbon, an mixtures thereof.
11. The method according to any one of items 1 to 10, wherein the non-graphitic carbonaceous material is mixed together with about 10 wt % to about 90 wt %, or about 20 wt % to about 80 wt % of a graphitic carbon material prior to the application of mechanical forces carried out in step a).

12. The method according to item 11, wherein the graphitic carbon material is selected from natural graphite, synthetic graphite, graphitized coke, or graphitized anthracite, optionally wherein the graphitic carbon material is characterized by a particle size having a $D_{50}$ of less than about 1 mm.

13. The method according to any one of items 1 to 12, wherein the particles obtained from step b) are dispersed in a liquid, optionally in the presence of a dispersant or a polymer compound.

14. Surface-functionalized carbonaceous particles, obtainable by a method according to any one of items 1 to 13.

15. Surface-functionalized carbonaceous particles having:
    a crystallographic $L_c$ value of less than about 14 nm, or less than about 12 nm, or less than about 10 nm; and
    an oxygen content greater than about 0.6 wt %, or greater than about 0.8 wt %, or greater than about 1 wt %.

16. The surface-functionalized carbonaceous particles according to item 15, further characterized by:
    i) a BET surface area greater than about 100 m²/g; and/or
    ii) an oil absorption (OA) of less than about 500 or less than about 400 or less than about 300 ml/100 g; and/or
    iii) an intraparticle pore volume of less than about 2 or less than about 1.8 mL/g; and/or
    iv) a total pore volume of less than about 3 or less than about 2.5 mL/g; and/or
    v) a lead uptake of greater than about 2800 ppm.

17. The surface-functionalized carbonaceous particles according to item 15 or item 16, further characterized by:
    i) an oxygen content (IGA) of more than about 0.6 wt %, or more than about 0.8 wt %, preferably more than about 1 wt %; and/or
    ii) a pH of an aqueous dispersion comprising the resulting particles is below 5.5, or below 5.3, or below 5.1. or below 5.0; and/or
    iii) a BET SSA of between about 100 m²/g and about 500 m²/g.

18. The surface-functionalized carbonaceous particles according to any one of items 15 to 17, further characterized by
    i) a xylene density of between about 1.65 g/cm³ and about 2.1 g/cm³; or between about 1.85 g/cm³ and about 2.00 g/cm³; or between about 1.95 g/cm³ and about 2.00 g/cm³; and/or
    ii) an oil absorption (OA) of between about 70 and about 300 ml/100 g; and/or
    iii) a lead uptake of between about 2500 ppm and about 40000 ppm; and/or
    iv) a 5 wt % mass loss by thermogravimetric analysis (TGA) at an onset temperature of below about 580° C., or below about 570° C.

19. The surface-functionalized carbonaceous particles according to any one of items 15 to 18, further characterized by a particle size distribution (PSD) of
    i) a particle size distribution (PSD) having a $D_{50}$ value of between 1.0 µm and 8.0 µm, optionally between 1.0 µm and 5.0 µm; and/or
    ii) a particle size distribution (PSD) having a $D_{90}$ value of between 12 µm and 70 µm, optionally between 15 µm and 40 µm; and/or
    iii) a particle size distribution (PSD) having a $D_{10}$ value of between 0.4 µm and 1.5 µm, optionally between 0.5 µm and 1.2 µm; and/or
    iv) a DFT mesopore area/BET SSA ratio of below about 0.15, or below about 0.12, or below about 0.10; and/or
    v) a DFT micropore area/BET SSA ratio of above about 0.25, or above about 0.30, or above about 0.32.

20. A composition comprising the surface-functionalized carbonaceous particles as defined in any one of items 15 to 19, and at least one lignosulfonate and/or barium sulfate.

21. Use of the surface-functionalized carbonaceous particles as defined in any one of items 15 to 19, or the composition according to item 20 as a conductive additive in a lead acid battery, or in a lithium sulfur battery, or as a catalyst support, or as an additive in batteries, or as an additive in polymers, or as a filtration aid, or as a capacitive deionization aid, or in an electrochemical double layer capacitor, optionally wherein the capacitor has an average capacitance of above 5.5 F/g, or above 6 F/g, or above 6.5 F/g, or above 7.0 F/g 22. A battery electrode comprising the surface-functionalized carbonaceous particles as defined in any one of items 15 to 19, or the composition as defined in item 20 as a conductive additive.

23. The battery electrode of item 22, further comprising barium sulfate in an amount of about 0.2 to about 2% by weight of the total mass of the electrode, and/or further comprising at least one lignosulfonate in an amount of about 0.1 to about 1.5% by weight of the total mass of the electrode.

24. Use of the battery electrode of item 22 or item 23 in lead acid batteries, or in lithium sulfur batteries.

25. A polymer compound filled with the surface-functionalized carbonaceous particles as defined in any one of items 15 to 19 or the composition as defined in item 20.

26. A dispersion of the surface-functionalized carbonaceous particles as defined in any one of items 15 to 19, or of the composition as defined in item 20, in a liquid, optionally in the presence of a dispersant and/or a polymer.

Having now described the various aspects of the present invention in general terms, it will be apparent to those of skill in the art that many modifications and slight variations are possible without departing from the spirit and scope of the present invention. Some embodiments will now be described by way of illustration, with reference to the following working examples.

EXAMPLES

Example 1

Method for the Preparation of Surface-Functionalized Carbonaceous Particles

Carbonaceous materials (precursors) having the characteristics as shown in Table 1 below were loaded into a drum mill having a chamber volume of 40-50 L being filled at about 25% volume with steel balls with diameter of about 30 mm for a total weight of 50 kg. The quantity of carbonaceous material loaded corresponds to a milling media-to-carbonaceous material weight ratio of about 25. The drum mill was filled with nitrogen and sealed gastight. The (dry) milling process was then carried out in the gastight milling chamber of the drum mill.

After the milling process was finalized, the ground material was allowed to rest for at least about 0.5 h in the sealed (airtight) milling chamber and then transferred into an intensive batch mixer (Eirich, Germany, 8 L batch size) for the functionalization process. The material was gently stirred in contact with air for a minimum of 1 h without any heating (i.e. starting at room temperature though the mixture warms up due to the exothermic reaction) resulting in the surface-functionalized carbon particles as characterized in Table 1.

Example 2

Method for the Preparation of Mixed Carbon/Graphite Surface-Functionalized Carbonaceous Particles A carbon black material having the characteristics as shown in Table 2 below was mixed with synthetic graphite, TIMREX® KS 500 (graphite/carbon black weight ratio 60/40 (Material 7) and 80/20 (Material 8), respectively), loaded into a drum mill having a chamber volume of 40-50 L being filled at about 25% volume with steel balls with diameter of about 30 mm for a total weight of 50 kg. Typical

TABLE 1

Physical Characteristics of Carbonaceous Starting Materials and of the Surface-Functionalized Carbonaceous Particles prepared according to Example 1:

| | Precursor Carbon Black (CB1) for Material No. 1 | Material No. 1 (CB1) | Precursor Coke for Material No. 2, 3 | Material No. 2 (Coke) | Material No. 3 (Coke) | Precursor CB (CB2) for Material No. 4, 5 | Material No. 4 CB2 (high BET) | Material No. 5 CB2 (high BET) |
|---|---|---|---|---|---|---|---|---|
| Milling time | | 35 h | | 16 | 48 | | 16 | 48 |
| BET SSA ($m^2/g$) | 64 | 291 | 3 | 126 | 193 | 780 | 755 | 693 |
| Crystallinity c/2 (nm) | 0.36 | 0.3592 | 0.3489 | 0.3508 | 0.3504 | 0.36 | 0.3629 | 0.3616 |
| Crystallinity $L_c$ (nm) | 2 | 2 | 2.8 | 2.4 | 2.3 | 2 | 2 | 2 |
| Raman $I_D/I_G$ intensity ratio | 0.96 | 0.91 | 0.96 | 0.90 | 0.90 | 0.96 | 1.14 | 1.12 |
| Crystallinity $L_c$ (nm) | 5 | 5 | 5 | 5 | 5 | 5 | 4 | 4 |
| Lead uptake (ppm) | 700 | 6000 | 25 | 2800 | 34000 | 9000 | 3000 | 11000 |
| Xylene density ($g/cm^3$) | 1.89 | 1.92 | 2.076[6)] | 1.96 | 1.972 | 1.96 | 1.986 | 1.968 |
| Scott density ($g/cm^3$) | 0.149 | 0.274 | 0.30 | 0.421 | 0.386 | 0.11 | 0.166 | 0.209 |
| $D_{10}$ (Sympatec) (μm) | 1. | 0.8 | 2.0 | 0.6 | 0.6 | | 1.7 | 1.5 |
| $D_{50}$ (Sympatec) (μm) | 6.32 | 2.9 | 12.3 | 2.0 | 2.1 | | 5.3 | 5.3 |
| $D_{90}$ (Sympatec) (μm) | 85. | 17.4 | 35.5 | 17.5 | 20.6 | | 43.7 | 43.4 |
| pH | 5.5[( )] | 4.1 | 4.6 | 4.4 | 3.3 | | 5.2 | 4.8 |
| OA (Marcol) | 560 | 120 | 52 | 73 | 89 | >560 | 255 | 206 |
| IGA oxygen (%) | 0.085 | 2.8 | 0.028 | 1.9 | 3.4 | 0.53 | 0.87 | 1.3 |
| micropore volume/DFT ($cm^3/g$) | 0.008 | 0.054 | 0.001 | 0.029 | 0.046 | 0.122 | 0.160 | 0.150 |
| mesopore volume/DFT ($cm^3/g$) | 0.111 | 0.247 | 0.006 | 0.031 | 0.044 | 0.152 | 0.312 | 0.330 |
| Total pore volume/DFT ($cm^3/g$) | 0.219 | 0.416 | 0.013 | 0.090 | 0.139 | 0.576 | 0.865 | 0.619 |
| Meso/total pore volume (%) | 51% | 59% | 46% | 34% | 32% | 26% | 36% | 53% |
| micropore area/DFT ($m^2/g$) | 12 | 108 | 0.0 | 43 | 135 | 312 | 401 | 370 |
| mesopore area/DFT ($m^2/g$) | 17 | 25 | 0.6 | 4 | 6 | 39 | 66 | 56 |
| Total pore area/DFT ($m^2/g$) | 31 | 136 | 0.7 | 47 | 142 | 359 | 473 | 430 |
| Meso/total DFT pore area (%) | 55% | 59% | 85% | 9% | 4% | 11% | 14% | 13% |
| Micro/BET (%) | 19% | 37% | 0% | 34% | 70% | 42% | 53% | 53% |
| Meso/BET (%) | 27% | 8% | 23% | 3% | 3% | 5% | 9% | 8% |
| Total pore volume (ml/g) | 3.63 | 1.72 | 0.83 | 0.96 | 1.08 | 5.12 | 0.96 | 2.39 |
| Intraparticle pore volume (<12 μm) (ml/g) | 2.08 | 1.29 | 0.58 | 0.63 | 0.70 | 3.04 | 0.65 | 1.66 |
| Pore < (40 nm) (mL/g) | 0.02 | 0.43 | 0.00 | 0.07 | 0.10 | 0.71 | 0.07 | 0.45 | values for the synthetic graphite are shown in Table 2A below. The quantity of carbonaceous material loaded corresponds to a milling media-to-carbonaceous material weight ratio of about 25. The drum mill was filled with nitrogen and sealed gastight. The (dry) milling process was then carried out in the gastight milling chamber of the drum mill.

After the milling process was finalized, the ground material was allowed to rest for at least about 0.5 h in the sealed (airtight) milling chamber and then transferred into an intensive batch mixer (Eirich, Germany, 8 L batch size) for the functionalization process. The material was gently stirred in contact with air for a minimum of 1 h without any heating (i.e. starting at room temperature though the mixture warms up due to the exothermic reaction) resulting in the surface-functionalized carbon particles as characterized in Table 2.

TABLE 2A

Physical Characteristics of Precursor Graphite Material TIMREX ® KS 500 precursor for Material Numbers 6 and 7:

| | Precursor Graphite (G) Material No. 6, 7 |
|---|---|
| BET SSA (m$^2$/g) | 1.6 |
| Crystallinity c/2 (nm) | 0.3359 |
| Xylene density (g/cm$^3$) | 2.26 |
| Bulk Density (g/cm$^3$) | 0.65 |
| Tap Density (g/cm$^3$) | 0.80 |
| Specific Volume Bulk (ml/100 g) | 154 |
| Specific Volume Tap (ml/100 g) | 125 |
| vibrated seiving >600 μm | 1% |
| vibrated seiving >500 μm | 16% |
| vibrated seiving >250 μm | 50% |
| vibrated seiving >150 μm | 67% |
| Airjet seiving >63 μm | 78% |
| OA (Marcol) | 47 |

TABLE 2B

Physical Characteristics of Carbonaceous Starting Materials and of the Surface-Functionalized Carbonaceous Particles prepared according to Example 2:

| | Precursor Carbon Black (CB) Material No. 1, 6, 7 | Material No. 1 CB1 | Material No. 6 G/CB1 | Material No. 7 G/CB1 |
|---|---|---|---|---|
| Graphite/Precursor CB | | 0/100 | 60/40 | 80/20 |
| Milling time | | 35 h | 23 h | 19 h |
| BET SSA (m$^2$/g) | 64 | 291 | 296 | 279 |
| Crystallinity c/2 (nm) | 0.36 | 0.3592 | 0.3363 | 0.3363 |
| Crystallinity L$_c$ (nm) | 2 | 2 | 21 | 26 |
| Raman I$_D$/I$_G$ intensity ratio | 0.96 | 0.91 | 0.61 | 0.49 |
| Crystallinity L$_a$ (nm) | 5 | 5 | 7 | 9 |
| Lead uptake (ppm) | 700 | 6000 | 9300 | 8900 |
| Xylene density (g/cm$^3$) | 1.89 | 1.92 | 2.037 | 2.127 |
| Scott density (g/cm$^3$) | 0.149 | 0.274 | 0.284 | 0.294 |
| D$_{10}$ (Sympatec) (μm) | 1. | 0.8 | 1.0 | 1.2 |
| D$_{50}$ (Sympatec) (μm) | 6.32 | 2.9 | 6.2 | 7.2 |
| D$_{90}$ (Sympatec) (μm) | 85. | 17.4 | 59 | 66 |
| pH | 5.5( ) | 4.1 | 3.7 | 3.7 |
| OA (Marcol) | 560 | 120 | 115 | 108 |
| IGA oxygen (%) | 0.085 | 2.8 | 2.3 | 2.0 |
| micropore volume/DFT (cm$^3$/g) | 0.008 | 0.054 | 0.048 | 0.045 |
| mesopore volume/DFT (cm$^3$/g) | 0.111 | 0.247 | 0.250 | 0.208 |
| Total pore volume/DFT (cm$^3$/g) | 0.219 | 0.416 | 0.361 | 0.296 |
| Meso/total pore volume (%) | 51% | 59% | 69% | 70% |
| micropore area/DFT (m$^2$/g) | 12 | 108 | 96 | 96 |
| mesopore area/DFT (m$^2$/g) | 17 | 25 | 40 | 38 |
| Total pore area/DFT (m$^2$/g) | 31 | 136 | 138 | 135 |
| Meso/total DFT pore area (%) | 55% | 59% | 29% | 28% |
| Micro/BET (%) | 19% | 37% | 32% | 34% |
| Total pore volume (ml/g) | 3.63 | 1.72 | 1.64 | 1.58 |
| Intraparticle pore volume (<12 μm) (ml/g) | 2.08 | 1.29 | 1.19 | 1.10 |
| Pore < (40 nm) (mL/g) | 0.02 | 0.43 | 0.32 | 0.25 |

Example 3

Additional Characterization of Carbonaceous Materials (Resistivity and Compressibility)

The carbonaceous materials prepared as described in Examples 1 and 2 were further characterized in terms of their electrical resistivity and their compressibility. Results are summarized in Table 3 below.

TABLE 3

Resistivity and Compressibility of Carbonaceous Starting Materials and of the Surface-Functionalized Carbonaceous Particles prepared according to Examples 1 and 2:

| | Precursor CB for Material No. 1, 6, 7 | Material No. 1 (CB1) | Precursor Coke for Material No. 2, 3 | Material No. 2 (Coke) | Material No. 3 (Coke) | Precursor CB for Material No. 4, 5 | Material No. 4 CB2 (high BET) | Material No. 5 CB2 (high BET) | Material No. 6 CB1/G | Material No. 7 CB1/G |
|---|---|---|---|---|---|---|---|---|---|---|
| Resistivity @ 4 kN/cm$^2$ (ohm cm) | 0.052 | 0.427 | 0.045 | 0.108 | 0.137 | 0.089 | 0.077 | 0.078 | 0.083 | 0.049 |
| Resistivity @ 20 kN/cm$^2$ (ohm cm) | 0.019 | 0.075 | 0.023 | 0.032 | 0.042 | 0.023 | 0.024 | 0.026 | 0.033 | 0.023 |

TABLE 3-continued

Resistivity and Compressibility of Carbonaceous Starting Materials and of the Surface-Functionalized Carbonaceous Particles prepared according to Examples 1 and 2:

|  | Precursor CB for Material No. 1, 6, 7 | Material No. 1 (CB1) | Precursor Coke for Material No. 2, 3 | Material No. 2 (Coke) | Material No. 3 (Coke) | Precursor CB for Material No. 4, 5 | Material No. 4 CB2 (high BET) | Material No. 5 CB2 (high BET) | Material No. 6 CB1/G | Material No. 7 CB1/G |
|---|---|---|---|---|---|---|---|---|---|---|
| Density @ 4 kN/cm$^2$ (g/cm$^3$) | 0.84 | 0.97 | 1.43 | 1.38 | 1.37 | 0.60 | 0.70 | 0.81 | 1.12 | 1.24 |
| Density @ 8 kN/cm$^2$ (g/cm$^3$) | 1.02 | 1.12 | 1.67 | 1.52 | 1.54 | 0.83 | 0.87 | 0.97 | 1.31 | 1.46 |
| Density @ 12 kN/cm$^2$ (g/cm$^3$) | 1.15 | 1.24 | 1.83 | 1.63 | 1.64 | 0.97 | 1.01 | 1.11 | 1.46 | 1.63 |
| Density @ 20 kN/cm$^2$ (g/cm$^3$) | 1.37 | 1.43 | 2.05 | 1.80 | 1.83 | 1.18 | 1.24 | 1.33 | 1.70 | 1.91 |
| Density @ 100 kg*cm mechanical work (g/cm$^3$) | 1.60 | 1.06 | 1.62 | 1.60 | 1.59 | 0.47 | 0.66 | 0.80 | 1.23 | 1.36 |

As shown in Table 1 above, among other things, the BET SSA for Material 1 was increased to 291 m$^2$/g from the BET SSA of the precursor carbon black material (CB1) of only 64 m$^2$/g; the lead uptake increased to 6000 ppm from 700 ppm; and the IGA oxygen content (wt %) significantly increased to 2.8 from 0.085%.

For Materials 2 and 3, among other things, the BET SSA increased significantly over the very low BET SSA of the precursor coke material of only 3 m$^2$/g; the lead uptake also increased significantly as compared to the 25 ppm of the precursor coke; and the IGA oxygen content (wt %) increased significantly over the 0.028% of the precursor coke.

For Materials 4 and 5, among other things, the BET SSA was similar to that for the precursor carbon black (CB2) material; but the IGA oxygen content (wt %) increased over the 0.53% of the precursor carbon black (CB2); and the intraparticle pore volume (<12 μm) was significantly lower than the 3.04 ml/g of the precursor CB2 material.

As shown in Table 2B above, among other things, the BET SSA for Materials 6 and 7 (mixture of carbon black and graphite as a starting material) was significantly higher than the BET SSA of the precursor carbon black material (CB1) of only 64 m$^2$/g and of the precursor graphite material (BET SSA 1.6 m$^2$/g); the lead uptake increased significantly from the 700 ppm of the precursor CB1; and the IGA oxygen % increased significantly also from that of the precursor CB1.

As shown in Table 3 above, among other things, the resistivity @ 4 and 20 kN/cm$^2$ for Material 1 was increased slightly over that for the precursor carbon black material (CB1) of only 0.052 and 0.019, respectively.

Also, the resistivity @ 4 and 20 kN/cm$^2$ for Materials 2 and 3 were increased slightly over that for the precursor coke material of only 0.045 and 0.023, respectively.

Also, the resistivity @ 20 kN/cm$^2$ for Materials 6 and 7 were increased slightly over that for the precursor CB1 material of only 0.019.

Also, the density at a compaction pressure of 4 kN/cm$^2$ or higher increases slightly for the carbon black derived materials, but for the coke derived materials it slightly decreases. Since the treatment is believed to destroy/modify the original carbon black structure, the compressibility of the treated carbon black derived materials was increased compared to the carbon black precursors, as can be seen from the densities measured at a mechanical work of 100 kg*cm in Table 3.

The increased content of oxygen-containing groups on the surface of the materials 1 to 7 (as indicated by their increased IGA oxygen %) over the precursor materials appears to be responsible for the observed high affinity to lead, which is expected to result in increased electrochemical deposition of lead.

Therefore, carbon materials such as materials 1-7 can be efficiently integrated in the lead structure of negative plates of, inter alia, lead acid batteries. As additives, such carbon materials can improve the cycling stability of lead acid batteries, particularly when operated in the high current partial state of charge operation mode of advanced lead acid batteries used in automobiles to support the start/stop function, as well as other industrial lead acid battery applications. In addition, carbons with elevated BET surface area, such as materials 1-7, also improve the charge acceptance of advanced lead acid batteries needed for the storage of electricity generated by the brake operation.

The invention claimed is:

1. A composition comprising surface-functionalized carbonaceous particles comprising:
   a crystallographic $L_c$ value of less than about 14 nm; and
   an oxygen content greater than about 0.6 wt %;
   wherein the surface-functionalized carbonaceous particles are non-graphitic.

2. The composition of claim 1, wherein the particles are further characterized by:
   (i) a BET surface area greater than about 100 m$^2$/g;
   (ii) an oil absorption of less than about 500 m L/100 g;
   (iii) an intraparticle pore volume of less than about 2 mL/g;
   (iv) a total pore volume of less than about 3 mL/g; and
   (v) a lead uptake of greater than about 2800 ppm.

3. The composition of claim 1, wherein the particles are further characterized by:
   (i) an oxygen content of more than about 0.6 wt %;
   (ii) an aqueous dispersion comprising the particles, the aqueous dispersion having a pH below 5.5;
   (iii) a BET SSA of between about 100 m$^2$/g and about 500 m$^2$/g;

(iv) a xylene density of between about 1.65 g/cm$^3$ and about 2.1 g/cm$^3$;
(v) an oil absorption of between about 70 and about 300 mL/100 g;
(vi) a lead uptake of between about 2500 ppm and about 40000 ppm; and
(vii) a 5 wt % mass loss by thermogravimetric analysis at an onset temperature of below about 580° C.

4. The composition of claim 1, wherein the particles are further characterized by:
   (i) a particle size distribution having a $D_{50}$ value of between 1.0 μm and 8.0 μm;
   (ii) a particle size distribution having a $D_{90}$ value of between 12 μm and 70 μm;
   (iii) a particle size distribution having a $D_{10}$ value of between 0.4 μm and 1.5 μm;
   (iv) a DFT mesopore area/BET SSA ratio of below about 0.15; or
   (v) a DFT micropore area/BET SSA ratio of above about 0.25.

5. The composition of claim 1, further comprising at least one lignosulfonate and/or barium sulfate.

6. The composition of claim 1, wherein the particles are further characterized by a BET surface area greater than about 100 m$^2$/g.

7. The composition of claim 1, wherein the particles are further characterized by an oil absorption of less than about 500 mL/100 g.

8. The composition of claim 1, wherein the particles are further characterized by an intraparticle pore volume of less than about 2 mL/g.

9. The composition of claim 1, wherein the particles are further characterized by a total pore volume of less than about 3 mL/g.

10. The composition of claim 1, wherein the particles are further characterized by a lead uptake of greater than about 2800 ppm.

11. The composition of claim 1, wherein the particles are further characterized by an oxygen content of more than about 0.6 wt %.

12. The composition of claim 1, wherein the particles are further characterized by an aqueous dispersion comprising the particles, the aqueous dispersion having a pH below 5.5.

13. The composition of claim 1, wherein the particles are further characterized by a BET SSA of between about 100 m$^2$/g and about 500 m$^2$/g.

14. The composition of claim 1, wherein the particles are further characterized by a xylene density of between about 1.65 g/cm$^3$ and about 2.1 g/cm$^3$.

15. The composition of claim 1, wherein the particles are further characterized by an oil absorption of between about 70 and about 300 mL/100 g.

16. The composition of claim 1, wherein the particles are further characterized by a lead uptake of between about 2500 ppm and about 40000 ppm.

17. The composition of claim 1, wherein the particles are further characterized by a 5 wt % mass loss by thermogravimetric analysis at an onset temperature of below about 580° C.

18. The composition of claim 1, wherein the particles are further characterized by:
    (i) a particle size distribution having a $D_{50}$ value of between 1.0 μm and 8.0 μm;
    (ii) a particle size distribution having a $D_{90}$ value of between 12 μm and 70 μm;
    (iii) a particle size distribution having a $D_{10}$ value of between 0.4 μm and 1.5 μm;
    (iv) a DFT mesopore area/BET SSA ratio of below about 0.15; and
    (v) a DFT micropore area/BET SSA ratio of above about 0.25.

* * * * *